(12) United States Patent
Wu

(10) Patent No.: US 9,612,421 B2
(45) Date of Patent: Apr. 4, 2017

(54) WIDE-ANGLE LENS

(71) Applicants: Sintai Optical (Shenzhen) Co., Ltd., Shenzhen, Guandong Province (CN); Asia Optical International Ltd., Tortola (GB)

(72) Inventor: Zhe-Ming Wu, Shenzhen (CN)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/623,606

(22) Filed: Feb. 17, 2015

(65) Prior Publication Data

US 2015/0241664 A1  Aug. 27, 2015

(30) Foreign Application Priority Data

Feb. 25, 2014  (CN) .......................... 2014 1 0064866

(51) Int. Cl.
  *G02B 9/62* (2006.01)
  *G02B 13/00* (2006.01)
  *G02B 13/06* (2006.01)
  *G02B 9/60* (2006.01)

(52) U.S. Cl.
  CPC ........... *G02B 9/62* (2013.01); *G02B 13/0045* (2013.01); *G02B 13/06* (2013.01); *G02B 9/60* (2013.01)

(58) Field of Classification Search
  CPC ........ G02B 9/62; G02B 9/64; G02B 13/0045; G02B 13/04
  USPC .......................... 359/713, 794, 681, 682, 770
  See application file for complete search history.

(56) References Cited

U.S. PATENT DOCUMENTS

| 5,485,314 A * | 1/1996 | Sato | G02B 15/177 359/691 |
|---|---|---|---|
| 5,552,937 A * | 9/1996 | Ono | G02B 15/177 359/680 |
| 5,798,872 A * | 8/1998 | Uzawa | G02B 15/173 359/686 |
| 2012/0026285 A1 | 2/2012 | Yoshida et al. | |
| 2014/0029115 A1 | 1/2014 | Liao et al. | |

FOREIGN PATENT DOCUMENTS

| CN | 102369471 A | 3/2012 |
|---|---|---|
| TW | M354745 | 4/2009 |
| TW | 201245757 A | 8/2014 |

OTHER PUBLICATIONS

English Abstract translation of TWM354745 (Published Apr. 11, 2009).

* cited by examiner

*Primary Examiner* — Darryl J Collins
*Assistant Examiner* — Journey Sumlar
(74) *Attorney, Agent, or Firm* — McClure, Qualey & Rodack, LLP

(57) ABSTRACT

A wide-angle lens includes a first lens, a second lens, a third lens, a fourth lens, a fifth lens and a sixth lens, all of which are arranged in sequence from an object side to an image side along an optical axis. The first lens is with negative refractive power and includes a convex surface facing the object side. The second lens includes a convex surface facing the object side. The third lens is a biconvex lens. The fourth lens is a biconvex lens. The fifth lens is a biconcave lens. The sixth lens is a biconvex lens. The fourth lens and the fifth lens are cemented together to form a cemented lens.

17 Claims, 24 Drawing Sheets

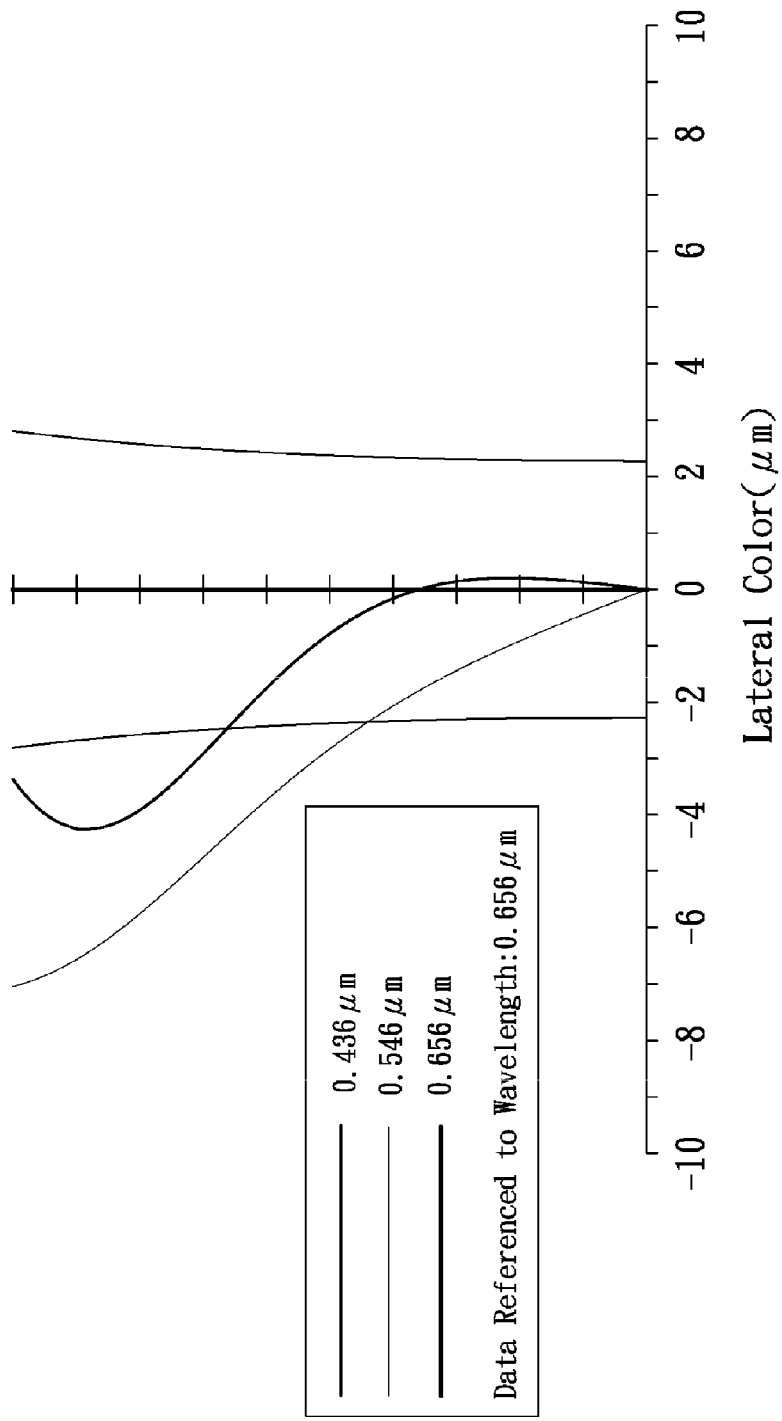

WIDE-ANGLE LENS

BACKGROUND OF THE INVENTION

Field of the Invention

The invention relates to a lens, and more particularly to a wide-angle lens.

Description of the Related Art

In recent years, digital still cameras have been gradually developed toward miniaturization for people to carry conveniently. Thus, the lens assemblies used for digital still cameras also require miniaturization. However, miniaturization of the lens assemblies is a challenge because more lenses are installed in digital still cameras, besides increasing the pixel number of sensing elements such as CCD or CMOS, to generate higher resolution images.

Further, the lifespan of a lens assembly will be greatly reduced if the lens assembly is frequently used in high temperature and high humidity environment.

BRIEF SUMMARY OF THE INVENTION

The invention provides a wide-angle lens to solve the above problems. The wide-angle lens of the invention, provided with characteristics of a larger field of view, miniaturization, high resolution and long lifespan. The wide-angle lens of the invention uses a combination of spherical lens and aspheric lens to reduce volume for miniaturization wherein the spherical lens and the aspheric lens are made of glass material that is high temperature resistant and high humidity resistant, and has elongated lifespan.

The wide-angle lens in accordance with an exemplary embodiment of the invention includes a first lens, a second lens, a third lens, a fourth lens, a fifth lens and a sixth lens, all of which are arranged in sequence from an object side to an image side along an optical axis. The first lens is with negative refractive power and includes a convex surface facing the object side. The second lens includes a convex surface facing the object side. The third lens is a biconvex lens. The fourth lens is a biconvex lens. The fifth lens is a biconcave lens. The sixth lens is a biconvex lens. The fourth lens and the fifth lens are cemented together to form a cemented lens.

In another exemplary embodiment, the wide-angle lens further includes a stop disposed between the third lens and the cemented lens.

In yet another exemplary embodiment, the first lens satisfies: $f_1/f<0$, wherein $f_1$ is an effective focal length of the first lens and f is an effective focal length of the wide-angle lens.

In another exemplary embodiment, the first lens and the sixth lens satisfy $0.5<|f_1/f_6|<5$, wherein $f_1$ is an effective focal length of the first lens and $f_6$ is an effective focal length of the sixth lens.

In yet another exemplary embodiment, the sixth lens satisfies $0<f_6/f<10$, wherein $f_6$ is an effective focal length of the sixth lens and f is an effective focal length of the wide-angle lens.

In another exemplary embodiment, the second lens further includes a surface, wherein the surface is an aspheric surface, or the convex surface of the second lens is an aspheric surface, or both of the surface and the convex surface of the second lens are aspheric surfaces.

In yet another exemplary embodiment, the third lens includes two convex surfaces, at least one of which is an aspheric surface or both of which are aspheric surfaces.

In another exemplary embodiment, the sixth lens includes two convex surfaces, at least one of which is an aspheric surface or both of which are aspheric surfaces.

In yet another exemplary embodiment, no air space exists between the fourth lens and the fifth lens.

In another exemplary embodiment, the first lens, the second lens, the third lens, the fourth lens, the fifth lens and the sixth lens are made of glass material.

In yet another exemplary embodiment, the first lens and the sixth lens satisfy $f_1/f<0$, $0.5<|f_1/f_6|<5$, wherein $f_1$ is an effective focal length of the first lens, f is an effective focal length of the wide-angle lens and $f_6$ is an effective focal length of the sixth lens.

In another exemplary embodiment, the first lens and the sixth lens satisfy $f_1/f<0$, $0<f_6/f<10$, wherein $f_1$ is an effective focal length of the first lens, f is an effective focal length of the wide-angle lens and $f_6$ is an effective focal length of the sixth lens.

In yet another exemplary embodiment, the first lens and the sixth lens satisfy $0.5<|f_1/f_6|<5$, $0<f_6/f<10$, wherein $f_1$ is an effective focal length of the first lens, f is an effective focal length of the wide-angle lens and $f_6$ is an effective focal length of the sixth lens.

In another exemplary embodiment, the first lens and the sixth lens satisfy $f_1/f<0$, $0.5<|f_1/f_6|<5$, $0<f_6/f<10$, wherein $f_1$ is an effective focal length of the first lens, f is an effective focal length of the wide-angle lens and $f_6$ is an effective focal length of the sixth lens.

A detailed description is given in the following embodiment with reference to the accompanying drawings.

BRIEF DESCRIPTION OF THE DRAWINGS

The invention can be more fully understood by reading the subsequent detailed description and examples with references made to the accompanying drawings, wherein:

FIG. 6F is a lateral color diagram of the wide-angle lens in accordance with the third embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
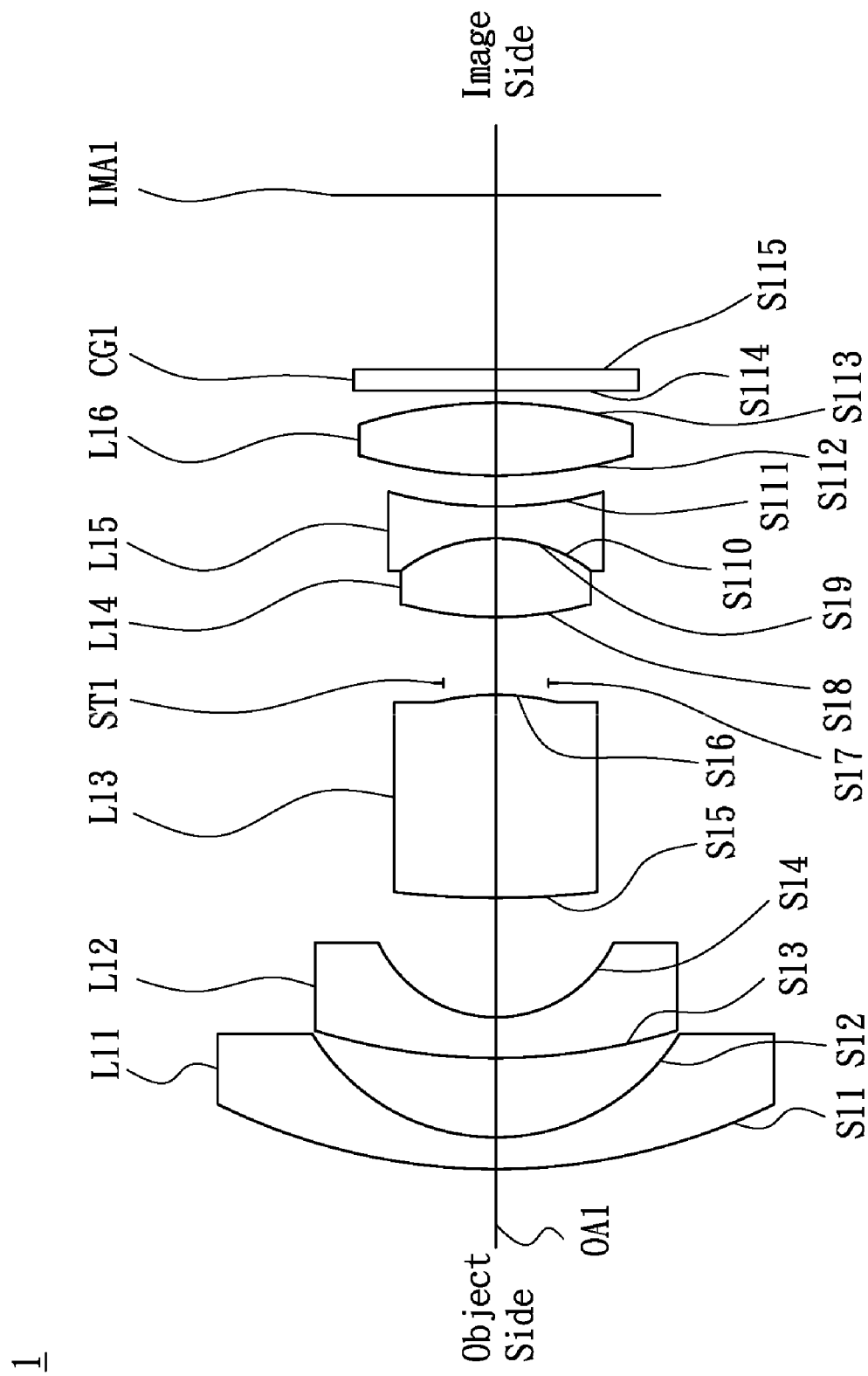
FIG. 1 is a lens layout diagram of a wide-angle lens in accordance with a first embodiment of the invention.

Referring to FIG. 1, FIG. 1 is a lens layout diagram of a wide-angle lens in accordance with a first embodiment of the invention. The wide-angle lens 1 includes a first lens L11, a second lens L12, a third lens L13, a stop ST1, a fourth lens L14, a fifth lens L15, a sixth lens L16 and a cover glass CG1, all of which are arranged in sequence from an object side to an image side along an optical axis OA1. In operation, an image of light rays from the object side is formed at an image plane IMA1. The first lens L11 is a spherical lens, made of glass material and with negative refractive power, wherein the object side surface S11 is a convex surface and the image side surface S12 is a concave surface. The second lens L12 is an aspheric lens and made of glass material, wherein the object side surface S13 is a convex surface and the image side surface S14 is a concave surface. The third lens L13 is an aspheric lens and made of glass material, wherein the object side surface S15 is a convex surface and the image side surface S16 is a convex surface. The fourth lens L14 is a spherical lens and made of glass material, wherein the object side surface S18 is a convex surface and the image side surface S19 is a convex surface. The fifth lens L15 is a spherical lens and made of glass material, wherein the object side surface S110 is a concave surface and the image side surface S111 is a concave surface. The image side surface S19 of the fourth lens L14 and the object side surface S110 of the fifth lens L15 are cemented together to form a cemented lens. The cemented lens can effectively reduce chromatic aberration. The sixth lens L16 is an aspheric lens and made of glass material, wherein the object side surface S112 is a convex surface and the image side surface S113 is a convex surface. Both of the object side surface S114 and image side surface S115 of the cover glass CG1 are plane surfaces.

In order to maintain excellent optical performance of the wide-angle lens in accordance with the first embodiment of the invention, the wide-angle lens 1 must satisfies the following three conditions:

$$f1_1/f1<0 \quad (1)$$

$$0.5<|f1_1/f1_6|<5 \quad (2)$$

$$0<f1_6/f1<10 \quad (3)$$

wherein $f1_1$ is an effective focal length of the first lens L11, f1 is an effective focal length of the wide-angle lens 1 and $f1_6$ is an effective focal length of the sixth lens L16.

By the above design of the lenses and stop ST1, the wide-angle lens 1 is provided with a field of view of about 150 degrees, an F-number of about 3.0, an effective corrected aberration and maintain good optical performance.

For the wide-angle lens 1 of the first embodiment, the effective focal length f1 of the wide-angle lens 1 is equal to 2.711 mm, the effective focal length $f1_1$ of the first lens L11 is equal to −11.623 mm, and the effective focal length $f1_6$ of the sixth lens L16 is equal to 6.512 mm. According to the above data, the following values can be obtained:

$$f1_1/f1=-4.287,$$

$$|f1_1/f1_6|=1.785,$$

$$f1_6/f1=2.402,$$

which respectively satisfy the above conditions (1)-(3).

Figure 2A:
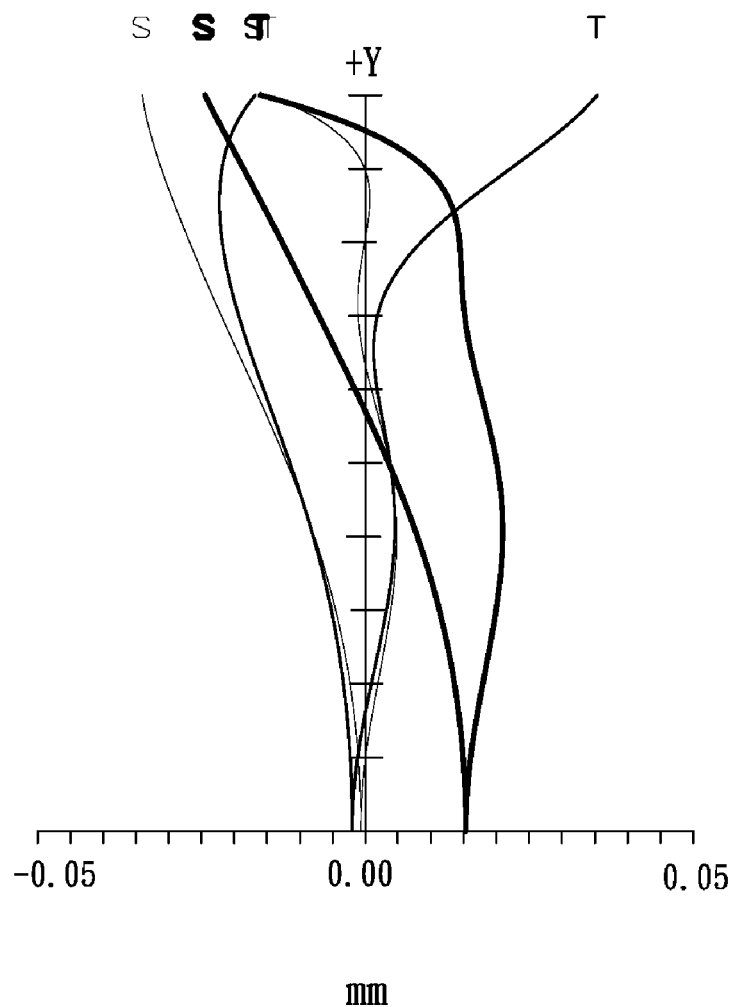
FIG. 2A is a field curvature diagram of the wide-angle lens in accordance with the first embodiment of the invention.
Figure 2B:
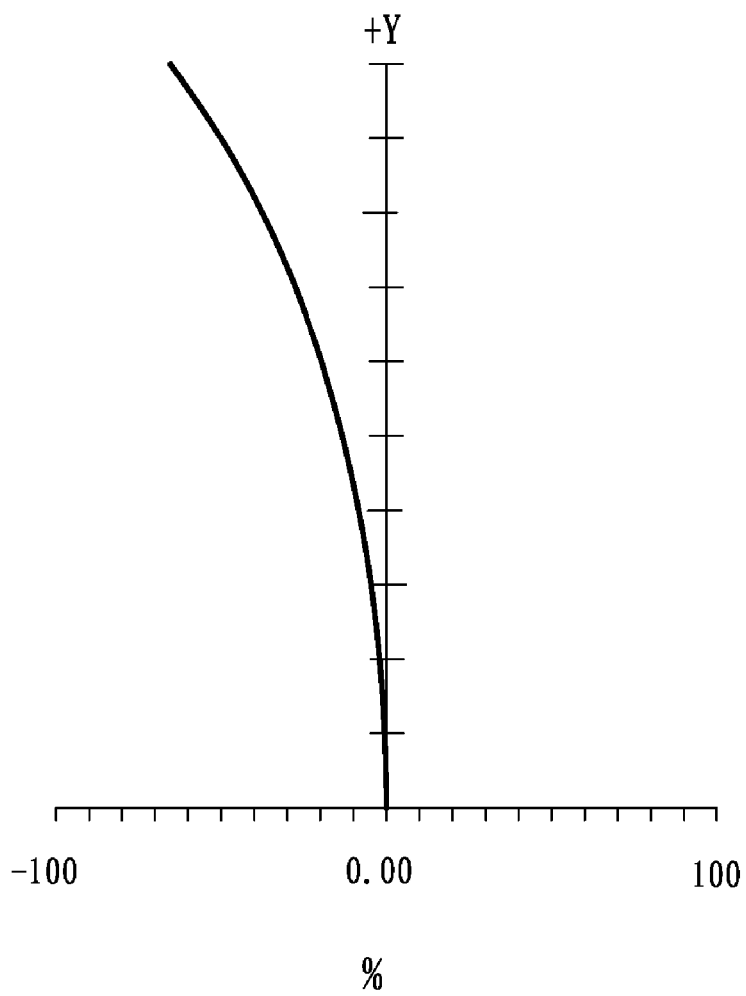
FIG. 2B is a distortion diagram of the wide-angle lens in accordance with the first embodiment of the invention.
Figure 2C:
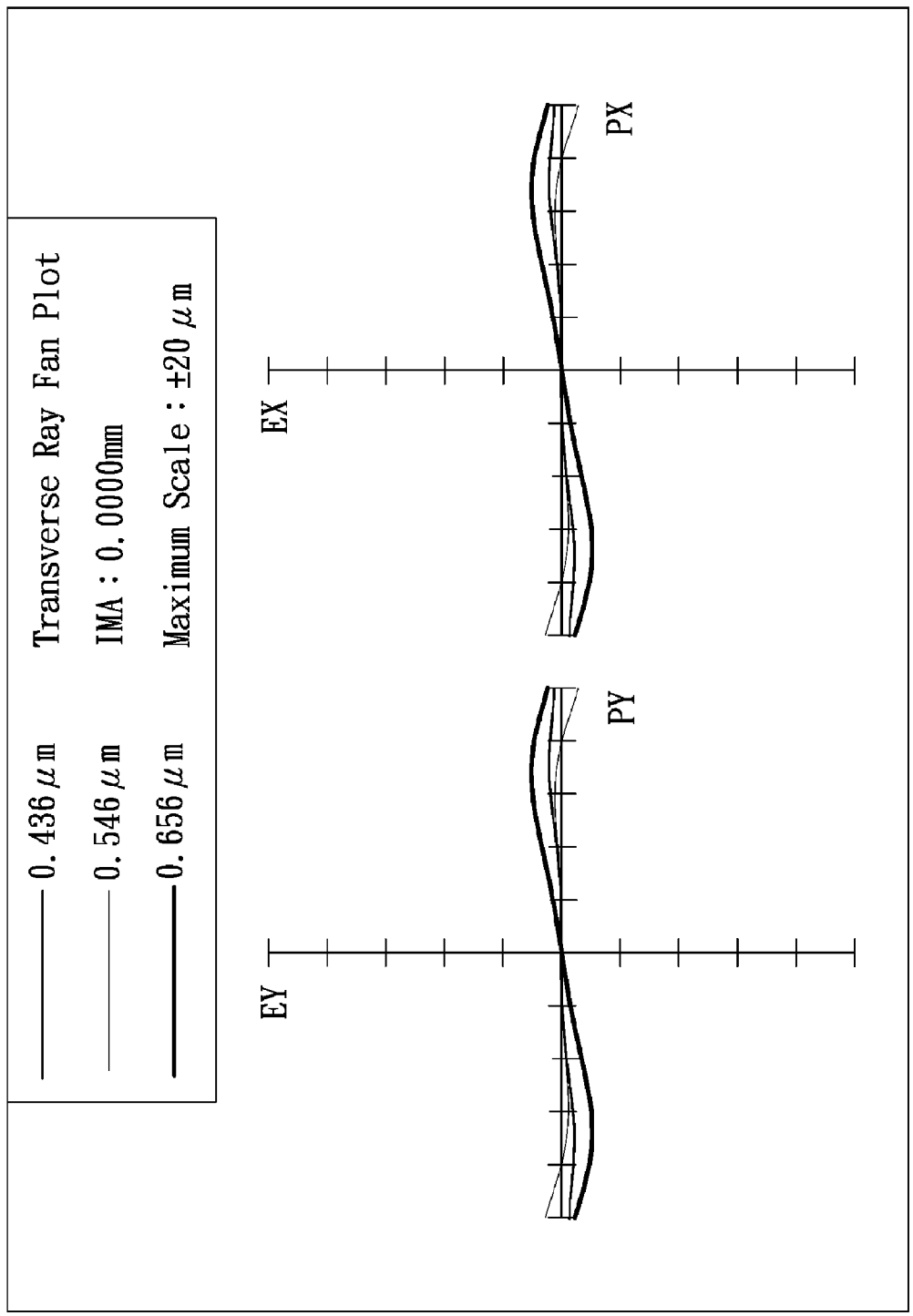
FIGS. 2C-2E are transverse ray fan diagrams of the wide-angle lens in accordance with the first embodiment of the invention.
Figure 2D:
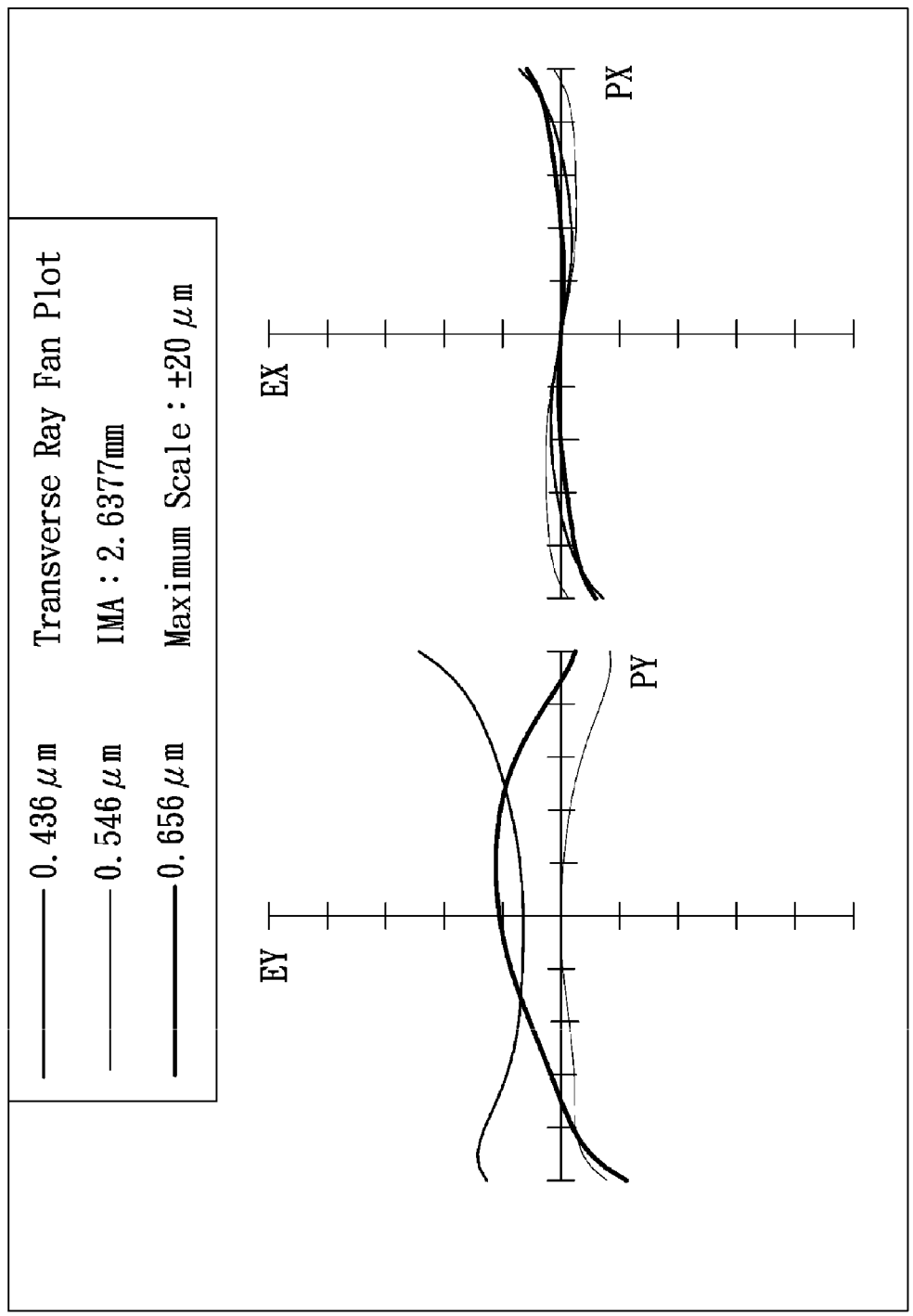
Figure 2E:
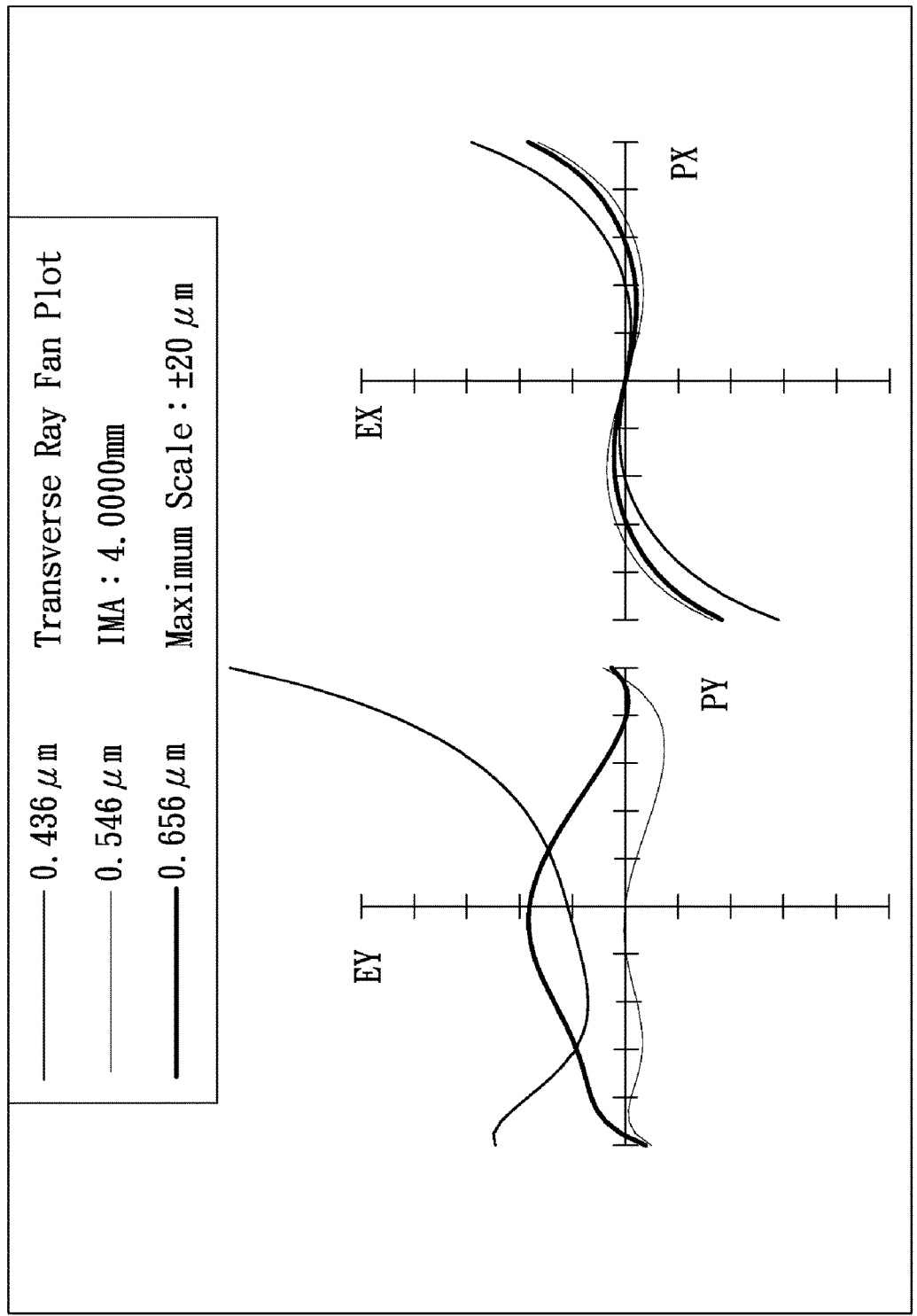
Figure 2F:
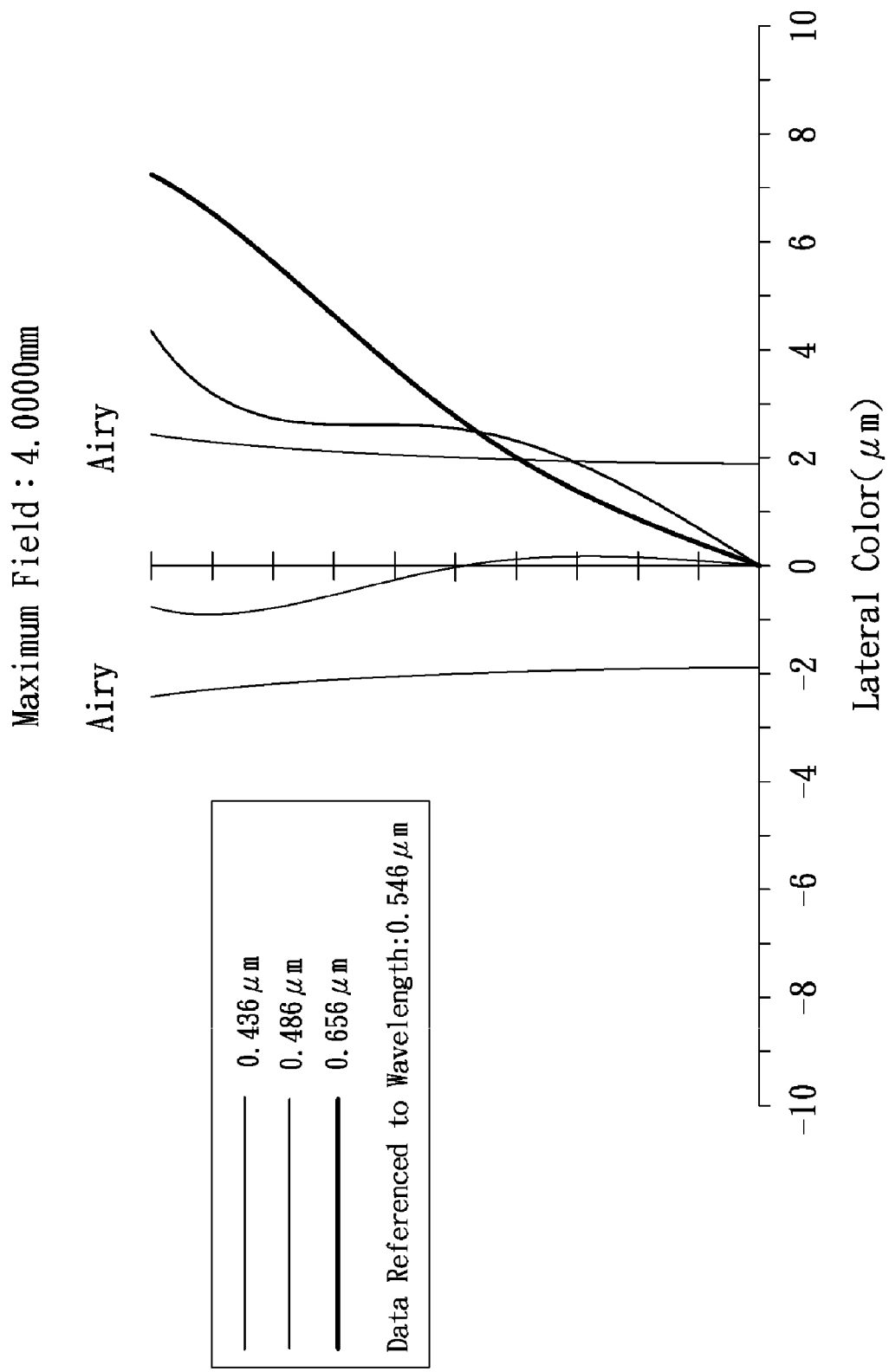
FIG. 2F is a lateral color diagram of the wide-angle lens in accordance with the first embodiment of the invention.
Figure 2G:
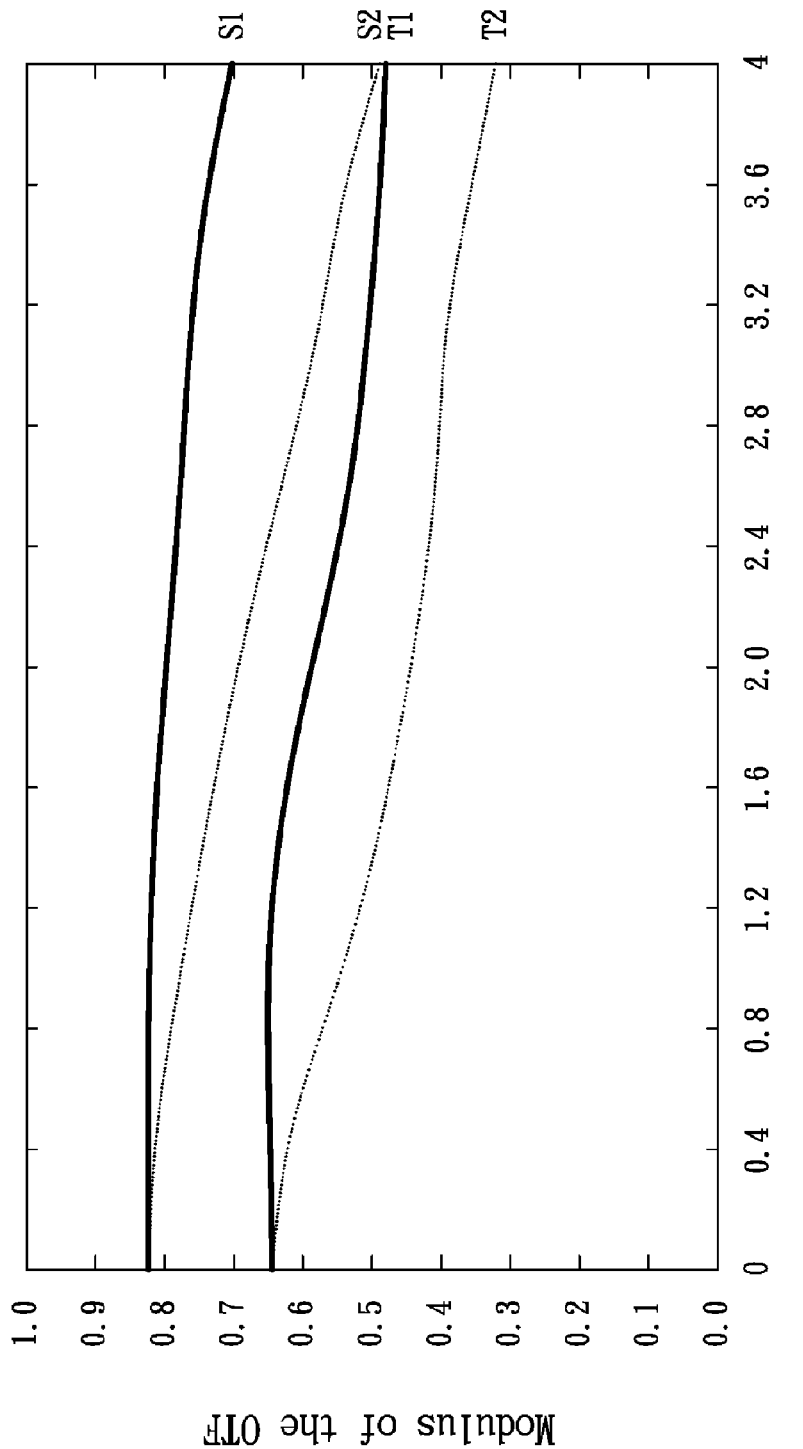
FIG. 2G is a modulation transfer function diagram of the wide-angle lens in accordance with the first embodiment of the invention.

By the above arrangements of the lenses and stop ST1, the wide-angle lens 1 of the first embodiment can meet the requirements of optical performance as seen in FIGS. 2A-2G, wherein FIG. 2A shows the field curvature diagram of the wide-angle lens 1 in accordance with the first embodiment of the invention, FIG. 2B shows the distortion diagram of the wide-angle lens 1 in accordance with the first embodiment of the invention, FIGS. 2C-2E show the transverse ray fan diagrams of the wide-angle lens 1 in accordance with the first embodiment of the invention, FIG. 2F shows the lateral color diagram of the wide-angle lens 1 in accordance with the first embodiment of the invention and FIG. 2G shows the modulation transfer function diagram of the wide-angle lens 1 in accordance with the first embodiment of the invention.

It can be seen from FIG. 2A that the field curvature of tangential direction and sagittal direction in the wide-angle lens 1 of the first embodiment ranges between −0.035 mm and 0.035 mm for the wavelength of 0.436 µm, 0.546 µm and 0.656 µm. It can be seen from FIG. 2B (the three lines in the figure almost coincide to appear as if a signal line) that the distortion in the wide-angle lens 1 of the first embodiment ranges between 65.9% and 0.00% for the wavelength of 0.436 µm, 0.546 µm and 0.656 µm. It can be seen from FIGS. 2C-2E that the transverse ray aberration in the wide-angle lens 1 of the first embodiment ranges between −12.0 µm and 30.0 µm wherein the wavelength is 0.436 µm, 0.546 µm and 0.656 µm, each field is 0.0000 mm, 2.6377 mm and 4.0000 mm. It can be seen from FIG. 2F that the lateral color with reference wavelength is equal to 0.546 µm in the wide-angle lens 1 of the first embodiment ranges between −0.94 µm and 7.30 µm for the wavelength of 0.436 µm, 0.486 µm and 0.656 µm, field ranges between 0 mm and 4 mm. It can be seen from FIG. 2G that the modulation transfer function of tangential direction, sagittal direction and Y field in the wide-angle lens 1 of the first embodiment ranges between 0.49 and 0.83 wherein the wavelength ranges between 0.436 µm and 0.656 µm, Y field ranges between 0 mm and 4 mm, spatial frequency is equal to 80 lp/mm. It can be seen from FIG. 2G that the modulation transfer function of tangential direction, sagittal direction and Y field in the wide-angle lens 1 of the first embodiment ranges between 0.32 and 0.83 wherein the wavelength ranges between 0.436 µm and 0.656 µm, Y field ranges between 0 mm and 4 mm, spatial frequency is equal to 160 lp/mm. It is obvious that the field curvature, the distortion, the transverse ray aberration and the lateral color of the wide-angle lens 1 of the first embodiment can be corrected effectively, the image resolution can meet the requirement. Therefore, the wide-angle lens 1 of the first embodiment is capable of good optical performance.

Figure 3:
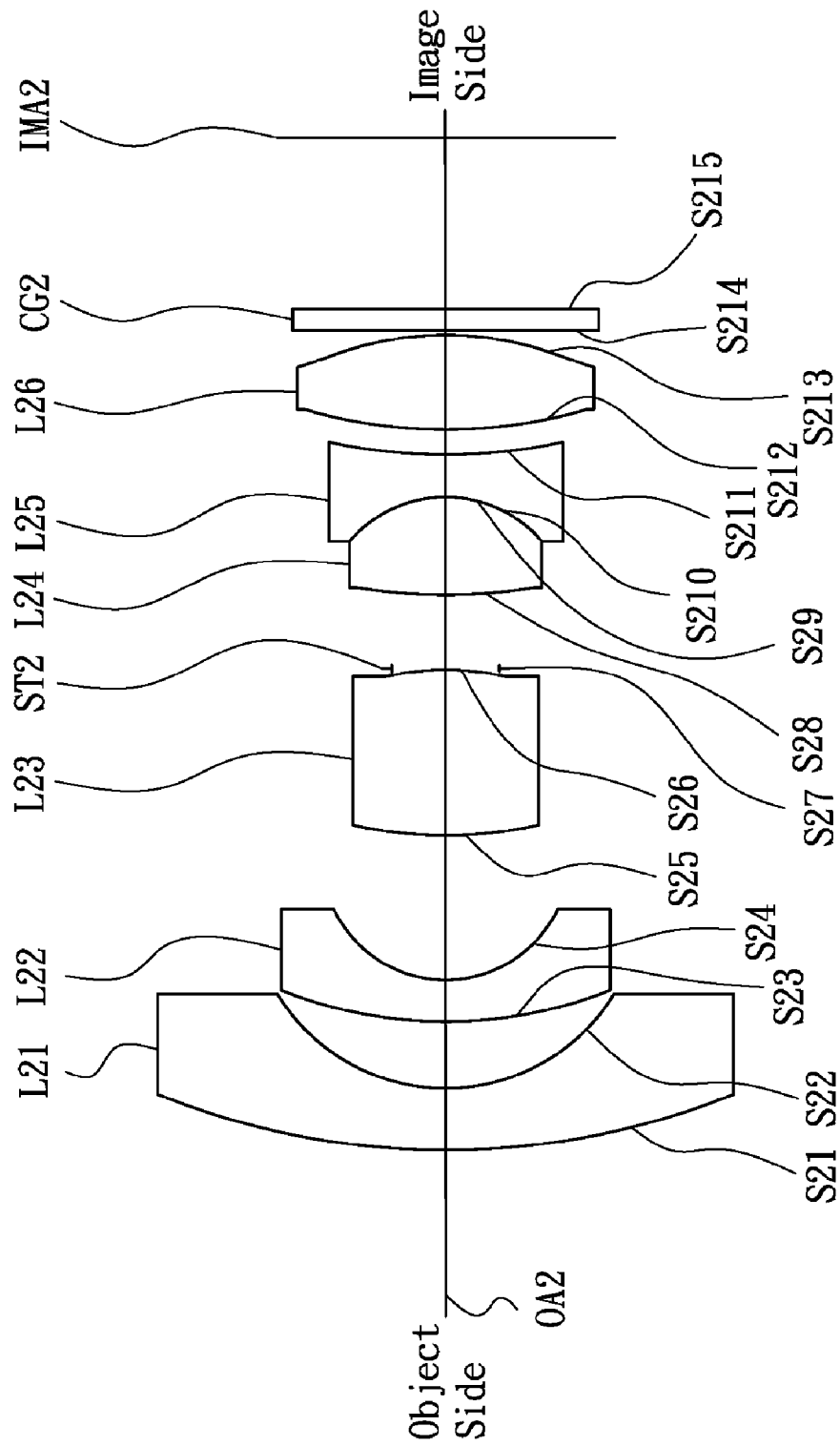
FIG. 3 is a lens layout diagram of a wide-angle lens in accordance with a second embodiment of the invention.

Referring to FIG. 3, FIG. 3 is a lens layout diagram of a wide-angle lens in accordance with a second embodiment of the invention. The wide-angle lens 2 includes a first lens L21, a second lens L22, a third lens L23, a stop ST2, a fourth lens L24, a fifth lens L25, a sixth lens L26 and a cover glass CG2, all of which are arranged in sequence from an object side to an image side along an optical axis OA2. In operation, an image of light rays from the object side is formed at an image plane IMA2. The first lens L21 is a spherical lens, made of glass material and with negative refractive power, wherein the object side surface S21 is a convex surface and the image side surface S22 is a concave surface. The second lens L22 is an aspheric lens and made of glass material, wherein the object side surface S23 is a convex surface and the image side surface S24 is a concave surface. The third lens L23 is an aspheric lens and made of glass material, wherein the object side surface S25 is a convex surface and the image side surface S26 is a convex surface. The fourth lens L24 is a spherical lens and made of glass material, wherein the object side surface S28 is a convex surface and the image side surface S29 is a convex surface. The fifth lens L25 is a spherical lens and made of glass material, wherein the object side surface S210 is a concave surface and the image side surface S211 is a concave surface. The image side surface S29 of the fourth lens L24 and the object side surface S210 of the fifth lens L25 are cemented together to form a cemented lens. The cemented lens can effectively reduce chromatic aberration. The sixth lens L26 is an aspheric lens and made of glass material, wherein the object side surface S212 is a convex surface and the image side surface S213 is a convex surface. Both of the object side surface S214 and image side surface S215 of the cover glass CG2 are plane surfaces.

In order to maintain excellent optical performance of the wide-angle lens in accordance with the second embodiment of the invention, the wide-angle lens 2 must satisfies the following three conditions:

$$f2_1/f2<0 \quad (4)$$

$$0.5<|f2_1/f2_6|<5 \quad (5)$$

$$0<f2_6/f2<10 \quad (6)$$

wherein $f2_1$ is an effective focal length of the first lens L21, f2 is an effective focal length of the wide-angle lens 2 and $f2_6$ is an effective focal length of the sixth lens L26.

By the above design of the lenses and stop ST2, the wide-angle lens 2 is provided with a field of view of about 150 degrees, an F-number of about 3.0, an effective corrected aberration and maintain good optical performance.

For the wide-angle lens 2 of the second embodiment, the effective focal length f2 of the wide-angle lens 2 is equal to 2.7234 mm, the effective focal length $f2_1$ of the first lens L21 is equal to −9.0879 mm, and the effective focal length $f2_6$ of the sixth lens L26 is equal to 6.0941 mm. According to the above data, the following values can be obtained:

$$f2_1/f2=-3.3370,$$

$$|f2_1/f2_6|=1.4913,$$

$$f2_6/f2=2.2377,$$

which respectively satisfy the above conditions (4)-(6).

Figure 4A:
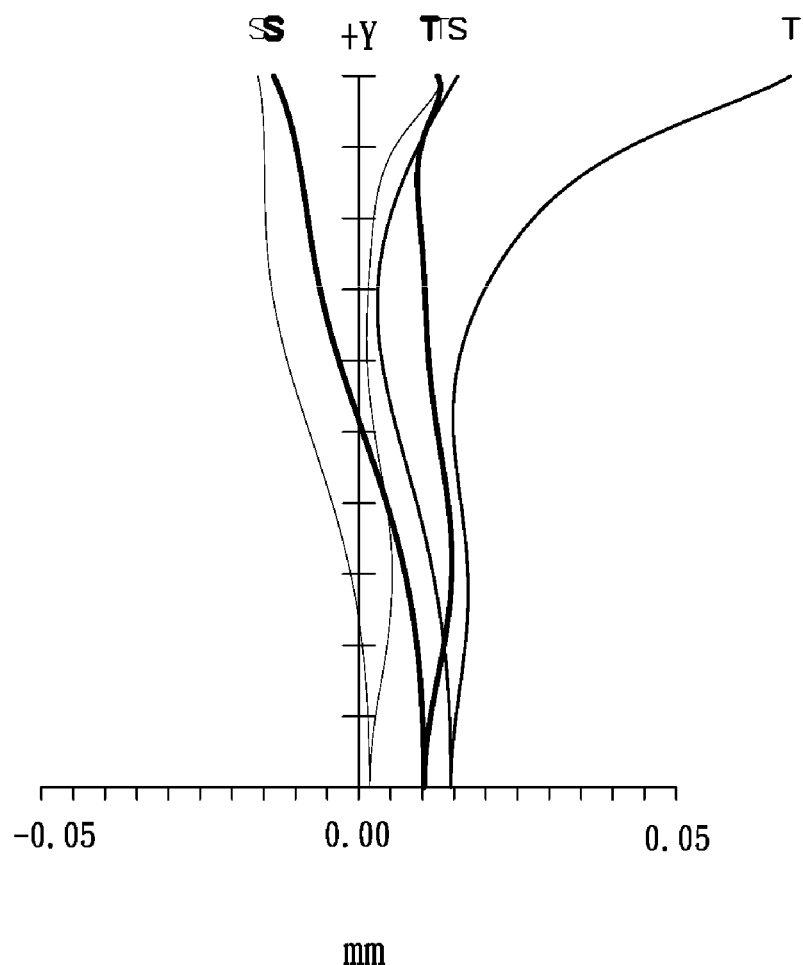
FIG. 4A is a field curvature diagram of the wide-angle lens in accordance with the second embodiment of the invention.
Figure 4B:
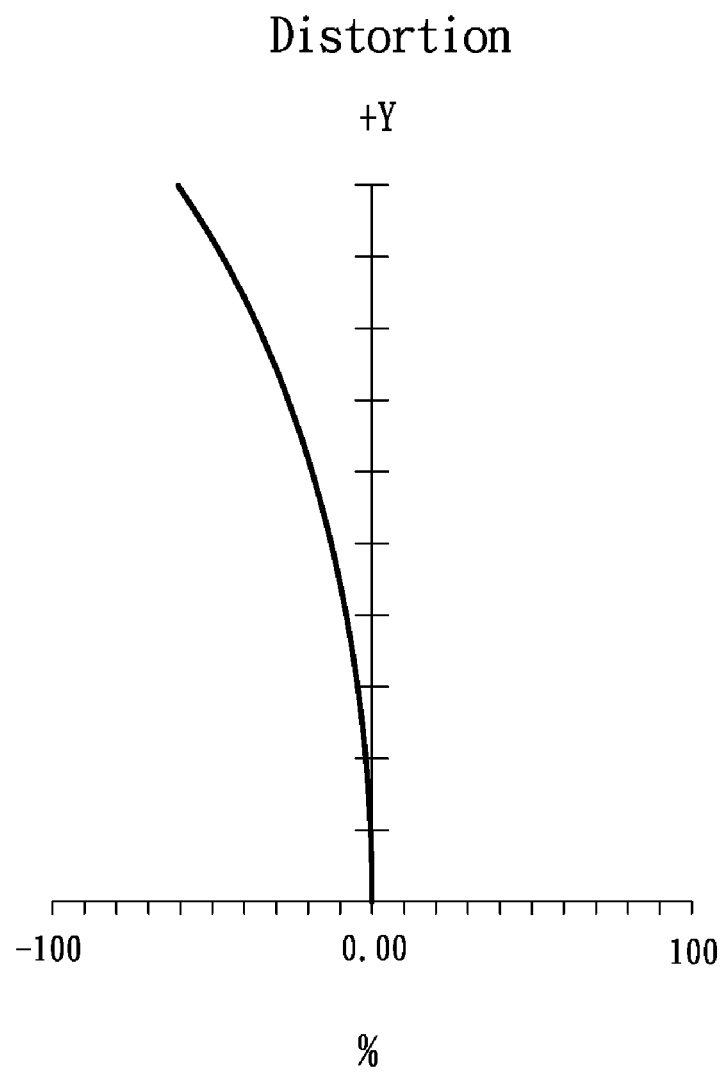
FIG. 4B is a distortion diagram of the wide-angle lens in accordance with the second embodiment of the invention.
Figure 4C:
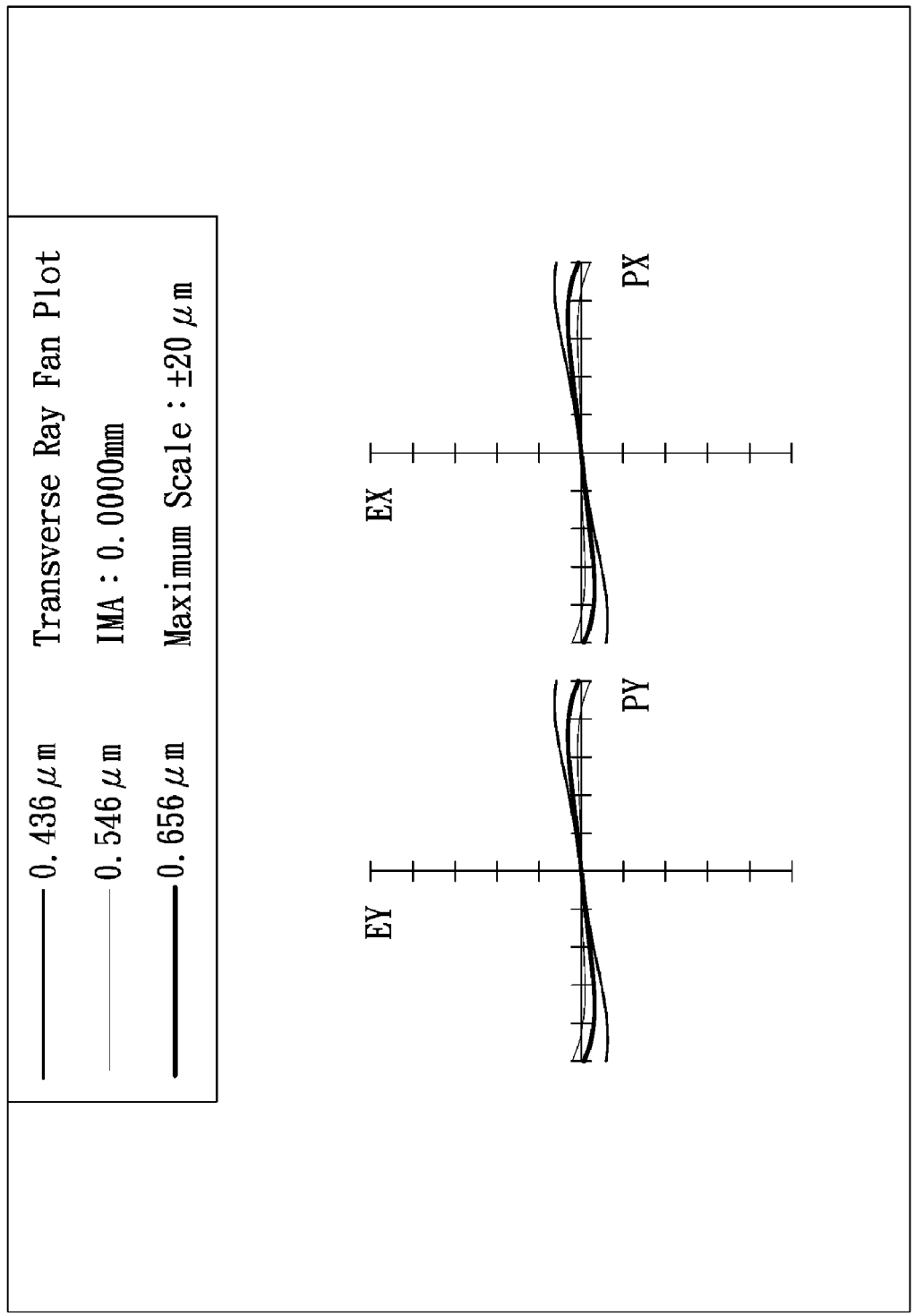
FIGS. 4C-4E are transverse ray fan diagrams of the wide-angle lens in accordance with the second embodiment of the invention.
Figure 4D:
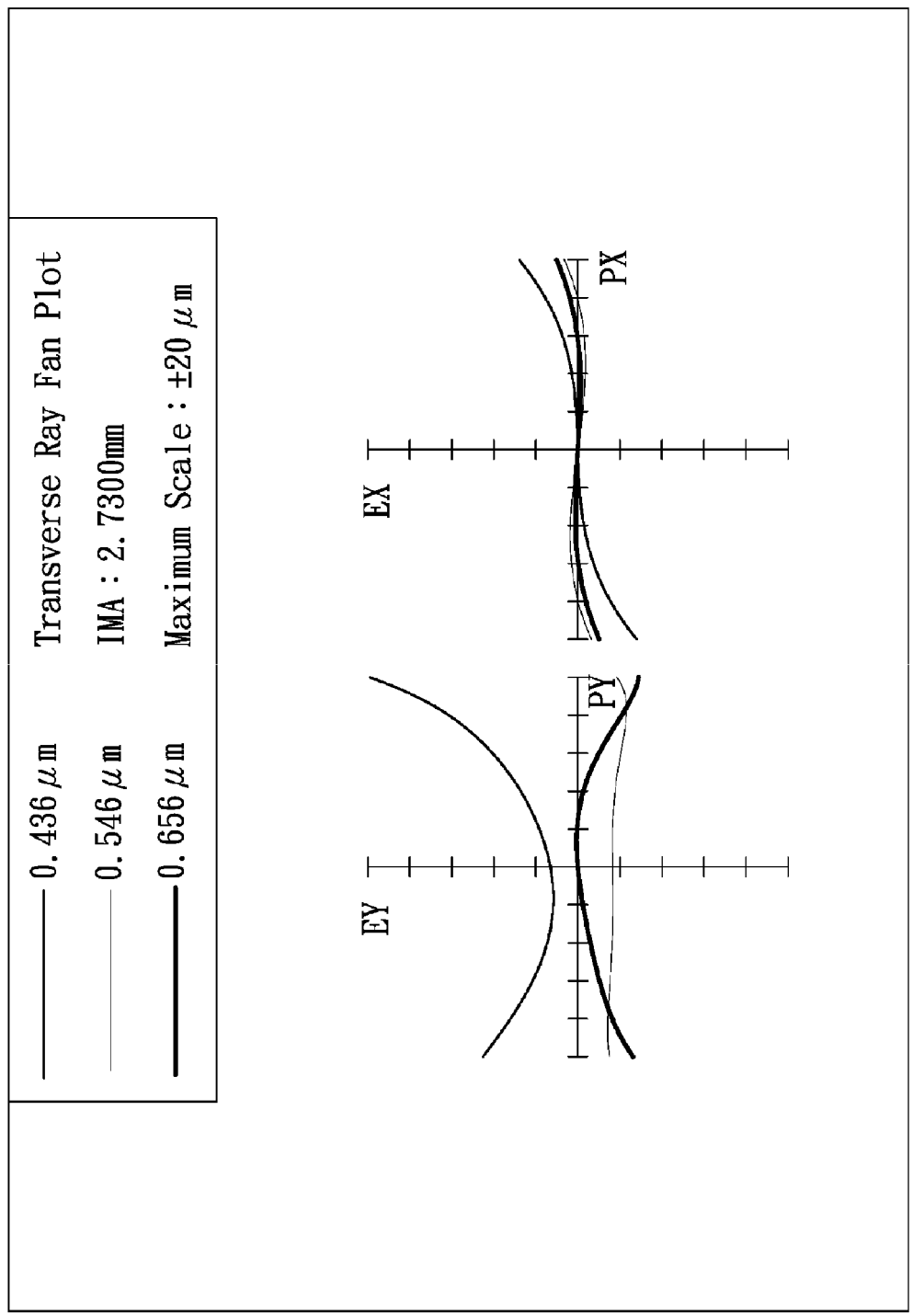
Figure 4E:
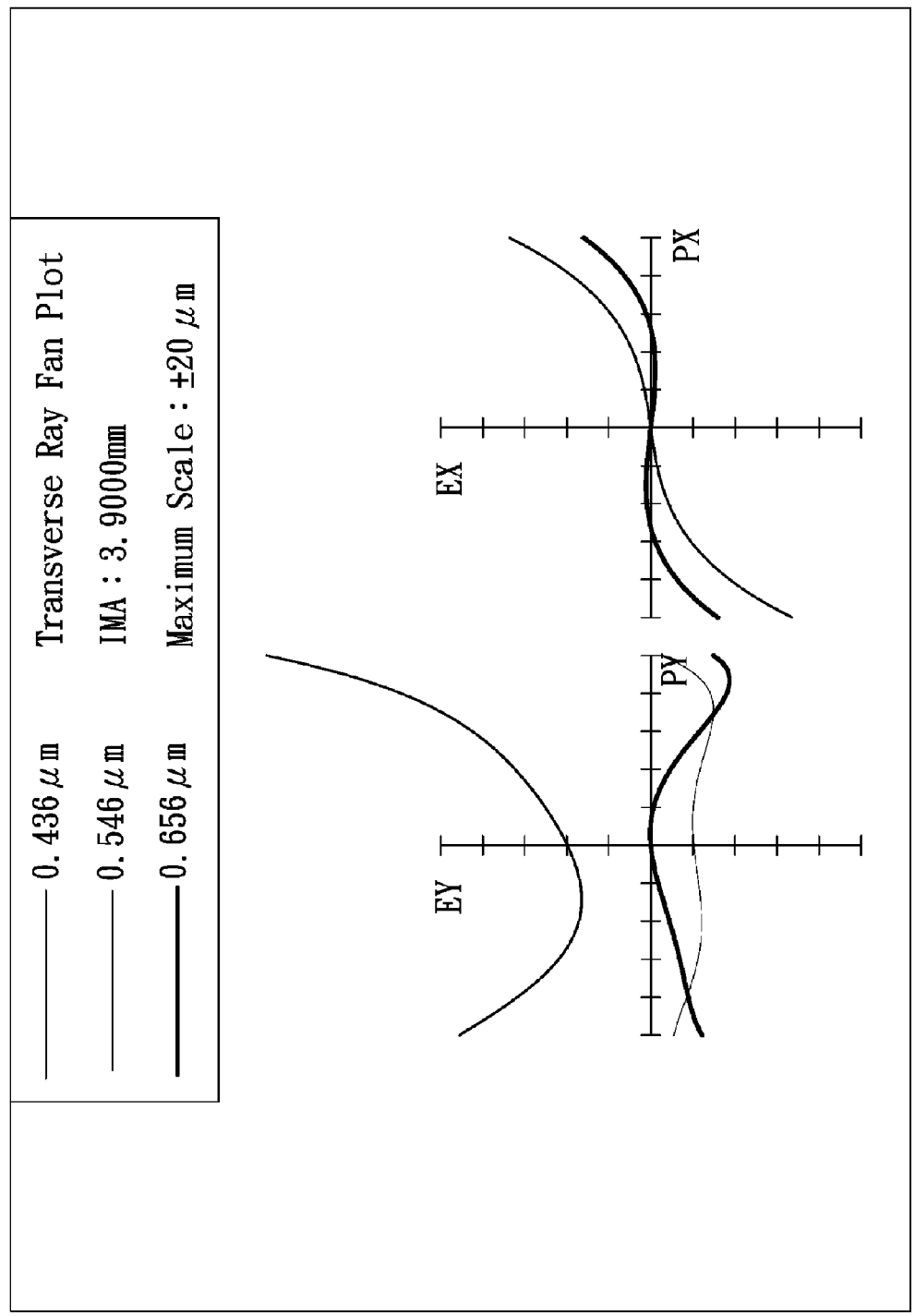
Figure 4F:
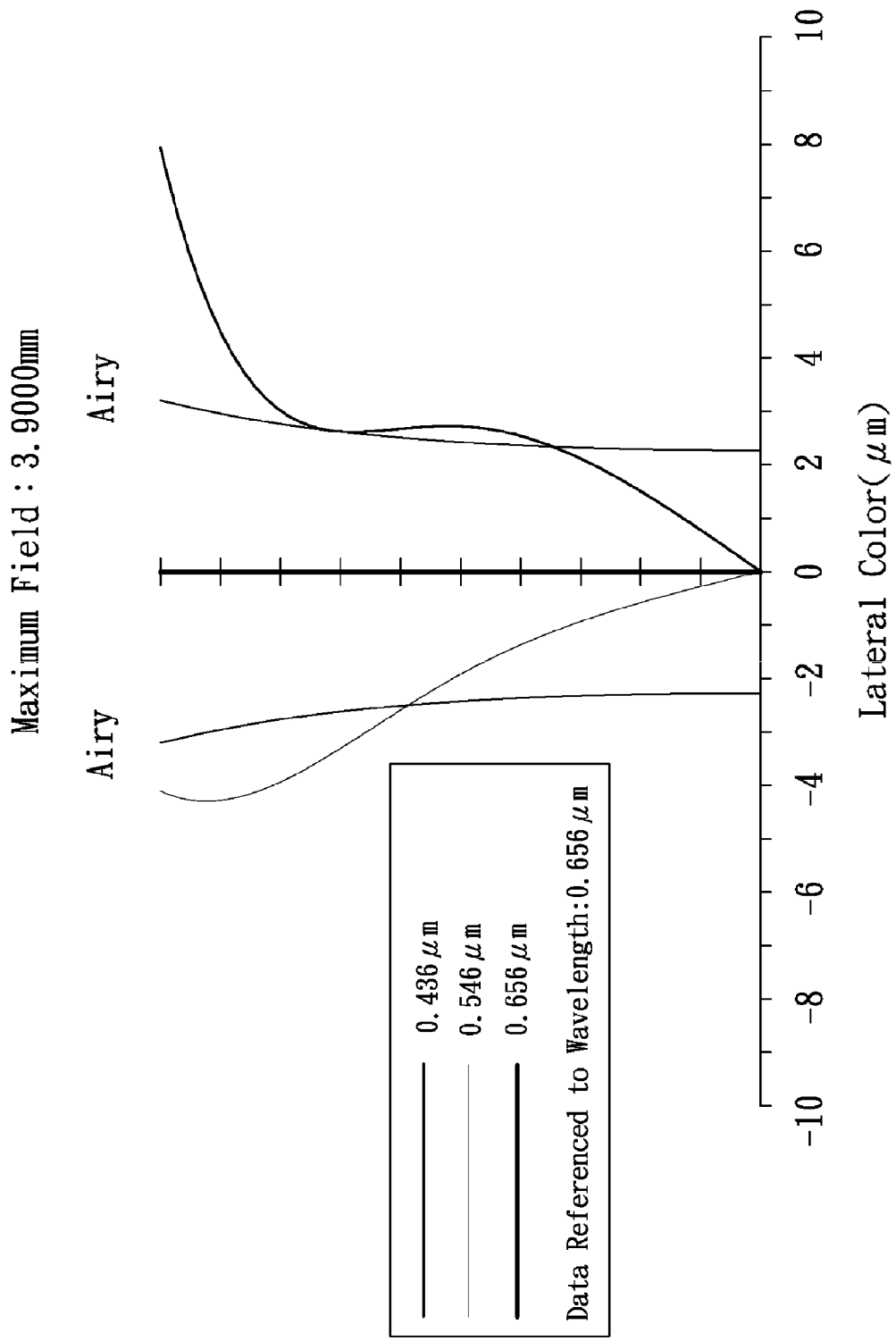
FIG. 4F is a lateral color diagram of the wide-angle lens in accordance with the second embodiment of the invention.
Figure 4G:
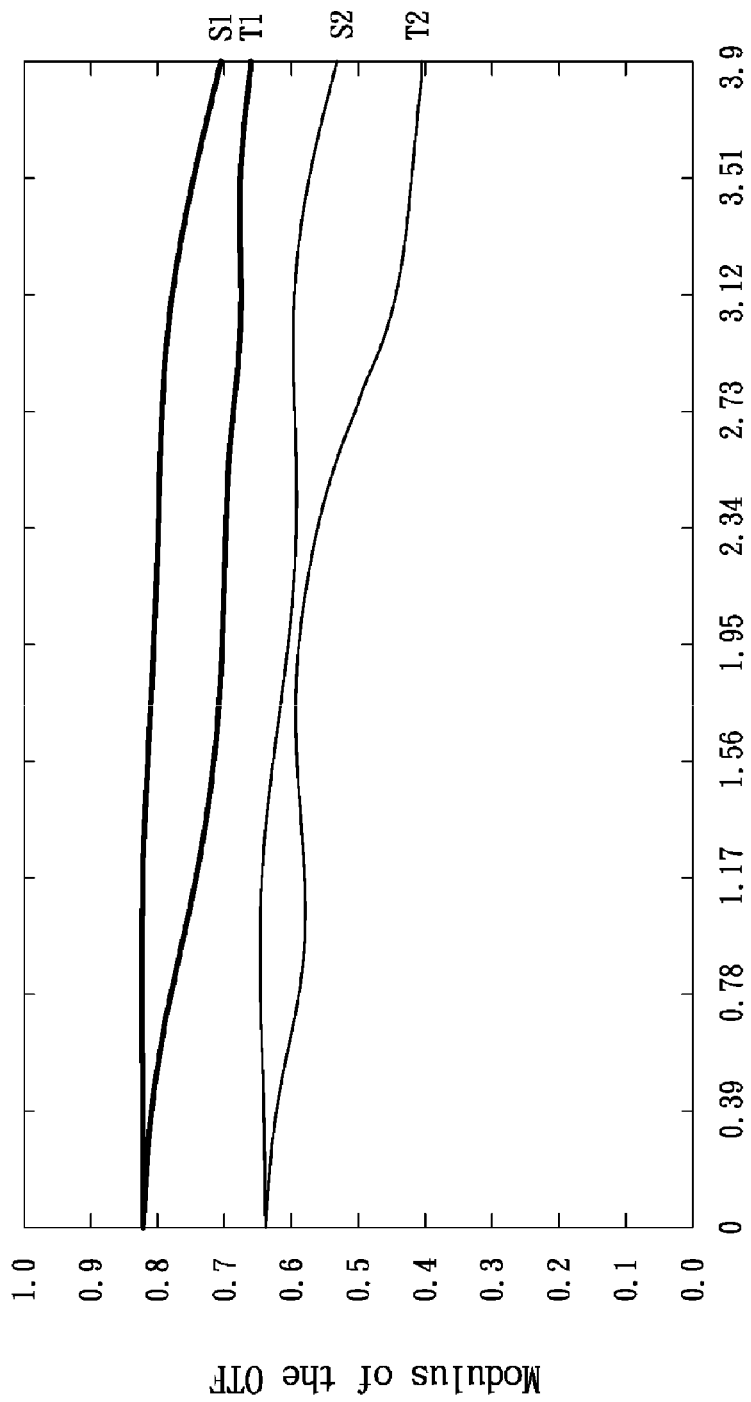
FIG. 4G is a modulation transfer function diagram of the wide-angle lens in accordance with the second embodiment of the invention.

By the above arrangements of the lenses and stop ST2, the wide-angle lens 2 of the second embodiment can meet the requirements of optical performance as seen in FIGS. 4A-4G, wherein FIG. 4A shows the field curvature diagram of the wide-angle lens 2 in accordance with the second embodiment of the invention, FIG. 4B shows the distortion diagram of the wide-angle lens 2 in accordance with the second embodiment of the invention, FIGS. 4C-4E show the transverse ray fan diagrams of the wide-angle lens 2 in accordance with the second embodiment of the invention, FIG. 4F shows the lateral color diagram of the wide-angle lens 2 in accordance with the second embodiment of the invention and FIG. 4G shows the modulation transfer function diagram of the wide-angle lens 2 in accordance with the second embodiment of the invention.

It can be seen from FIG. 4A that the field curvature of tangential direction and sagittal direction in the wide-angle lens 2 of the second embodiment ranges between −0.02 mm and 0.07 mm for the wavelength of 0.436 μm, 0.546 μm and 0.656 μm. It can be seen from FIG. 4B (the three lines in the figure almost coincide to appear as if a signal line) that the distortion in the wide-angle lens 2 of the second embodiment ranges between −60.5% and 0.00% for the wavelength of 0.436 μm, 0.546 μm and 0.656 μm. It can be seen from FIGS. 4C-4E that the transverse ray aberration in the wide-angle lens 2 of the second embodiment ranges between −13.5 μm and 35.0 μm wherein the wavelength is 0.436 μm, 0.546 μm and 0.656 μm, each field is 0.0000 mm, 2.7300 mm and 3.9000 mm. It can be seen from FIG. 4F that the lateral color with reference wavelength is equal to 0.656 μm in the wide-angle lens 2 of the second embodiment ranges between −4.5 μm and 8.0 μm for the wavelength of 0.436 μm, 0.546 μm and 0.656 μm, field ranges between 0 mm and 3.9000 mm. It can be seen from FIG. 4G that the modulation transfer function of tangential direction, sagittal direction and Y field in the wide-angle lens 2 of the second embodiment ranges between 0.66 and 0.82 wherein the wavelength ranges between 0.436 μm and 0.656 μm, Y field ranges between 0 mm and 3.9 mm, spatial frequency is equal to 80 lp/mm. It can be seen from FIG. 4G that the modulation transfer function of tangential direction, sagittal direction and Y field in the wide-angle lens 2 of the second embodiment ranges between 0.40 and 0.64 wherein the wavelength ranges between 0.436 μm and 0.656 μm, Y field ranges between 0 mm and 3.9 mm, spatial frequency is equal to 160 lp/mm. It is obvious that the field curvature, the distortion, the transverse ray aberration and the lateral color of the wide-angle lens 2 of the second embodiment can be corrected effectively, the image resolution can meet the requirement. Therefore, the wide-angle lens 2 of the second embodiment is capable of good optical performance.

Figure 5:
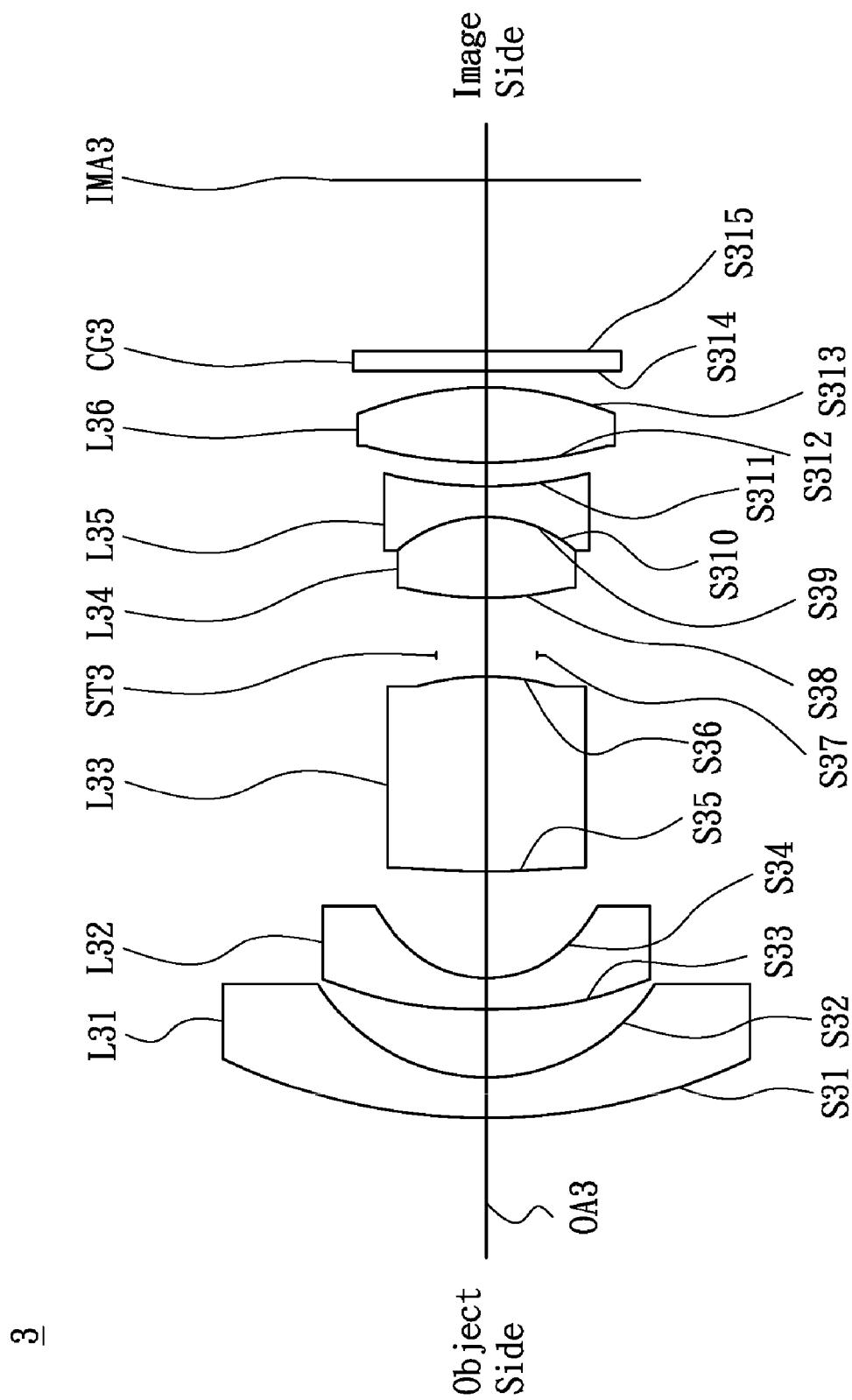
FIG. 5 is a lens layout diagram of a wide-angle lens in accordance with a third embodiment of the invention.

Referring to FIG. 5, FIG. 5 is a lens layout diagram of a wide-angle lens in accordance with a third embodiment of the invention. The wide-angle lens 3 includes a first lens L31, a second lens L32, a third lens L33, a stop ST3, a fourth lens L34, a fifth lens L35, a sixth lens L36 and a cover glass CG3, all of which are arranged in sequence from an object side to an image side along an optical axis OA3. In operation, an image of light rays from the object side is formed at an image plane IMA3. The first lens L31 is a spherical lens, made of glass material and with negative refractive power, wherein the object side surface S31 is a convex surface and the image side surface S32 is a concave surface. The second lens L32 is an aspheric lens and made of glass material, wherein the object side surface S33 is a convex surface and the image side surface S34 is a concave surface. The third lens L33 is an aspheric lens and made of glass material, wherein the object side surface S35 is a convex surface and the image side surface S36 is a convex surface. The fourth lens L34 is a spherical lens and made of glass material, wherein the object side surface S38 is a convex surface and the image side surface S39 is a convex surface. The fifth lens L35 is a spherical lens and made of glass material, wherein the object side surface S310 is a concave surface and the image side surface S311 is a concave surface. The image side surface S39 of the fourth lens L34 and the object side surface S310 of the fifth lens L35 are cemented together to form a cemented lens. The cemented lens can effectively reduce chromatic aberration. The sixth lens L36 is an aspheric lens and made of glass material, wherein the object side surface S312 is a convex surface and the image side surface S313 is a convex surface. Both of the object side surface S314 and image side surface S315 of the cover glass CG3 are plane surfaces.

In order to maintain excellent optical performance of the wide-angle lens in accordance with the third embodiment of the invention, the wide-angle lens 3 must satisfies the following three conditions:

$$f3_1/f3<0 \quad (7)$$

$$0.5<|f3_1/f3_6|<5 \quad (8)$$

$$0<f3_6/f3<10 \quad (9)$$

wherein $f3_1$ is an effective focal length of the first lens L31, $f3$ is an effective focal length of the wide-angle lens 3 and $f3_6$ is an effective focal length of the sixth lens L36.

By the above design of the lenses and stop ST3, the wide-angle lens 3 is provided with a field of view of about 150 degrees, an F-number of about 3.0, an effective corrected aberration and maintain good optical performance.

For the wide-angle lens 3 of the third embodiment, the effective focal length f3 of the wide-angle lens 3 is equal to 2.7362 mm, the effective focal length $f3_1$ of the first lens L31 is equal to −10.8398 mm, and the effective focal length $f3_6$ of the sixth lens L36 is equal to 6.2762 mm. According to the above data, the following values can be obtained:

$$f3_1/f3=-3.9616,$$

$$|f3_1/f3_6|=1.7271,$$

$$f3_6/f3=2.2938,$$

which respectively satisfy the above conditions (7)-(9).

Figure 6A:
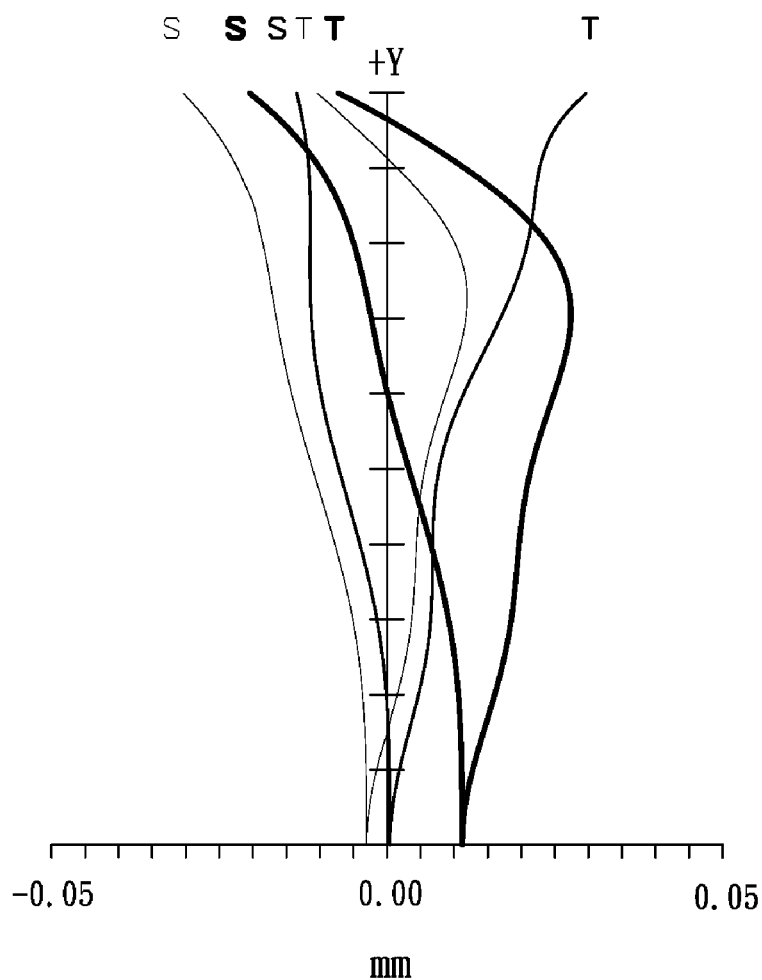
FIG. 6A is a field curvature diagram of the wide-angle lens in accordance with the third embodiment of the invention.
Figure 6B:
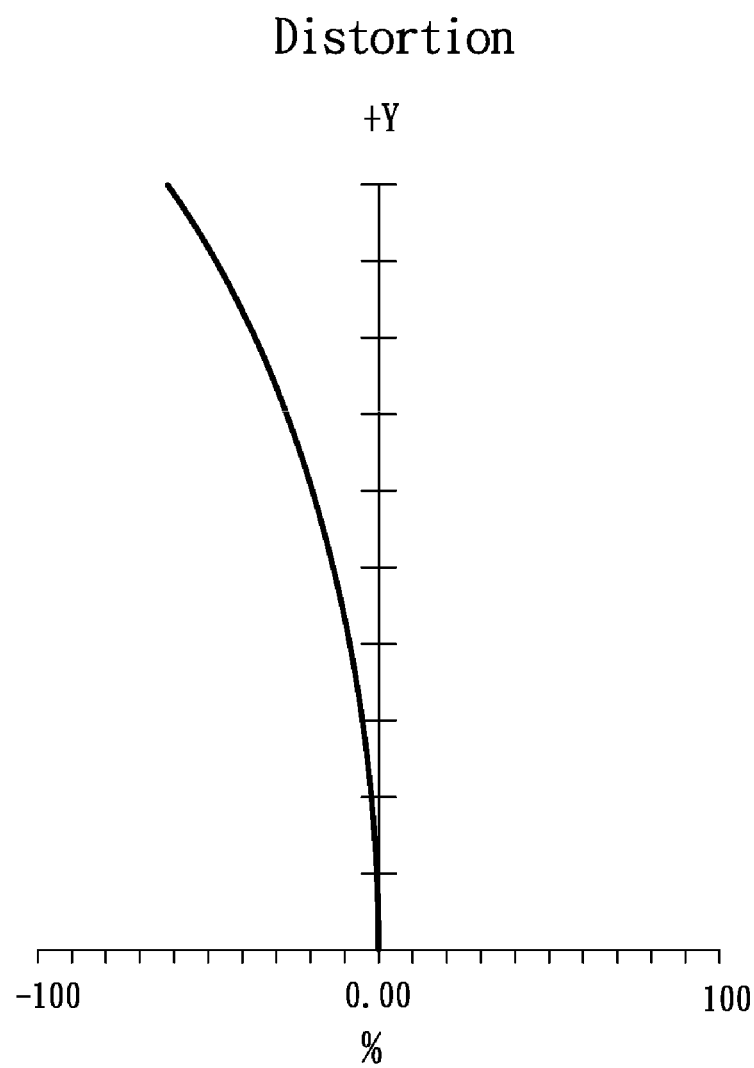
FIG. 6B is a distortion diagram of the wide-angle lens in accordance with the third embodiment of the invention.
Figure 6C:
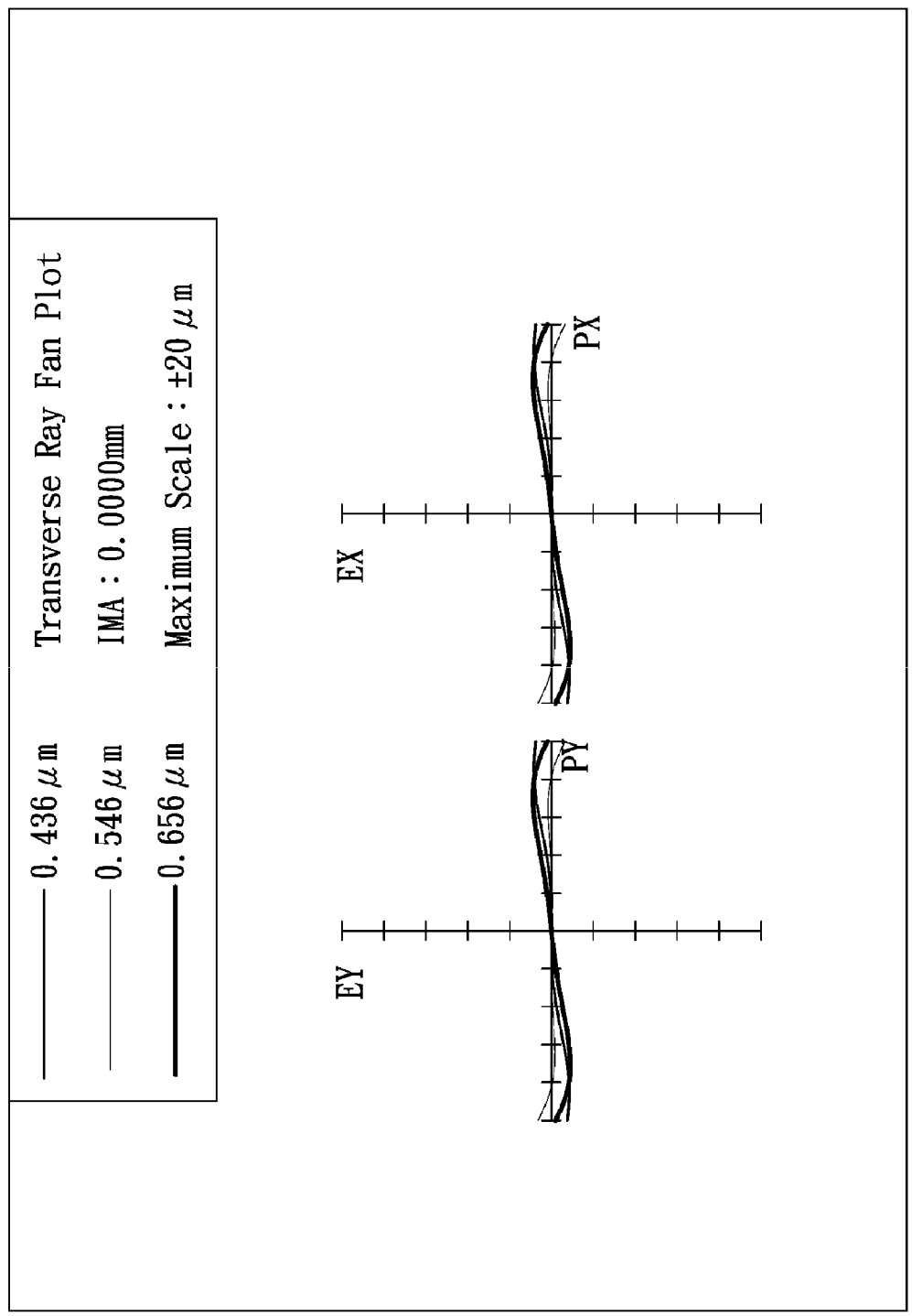
FIGS. 6C-6E are transverse ray fan diagrams of the wide-angle lens in accordance with the third embodiment of the invention.
Figure 6D:
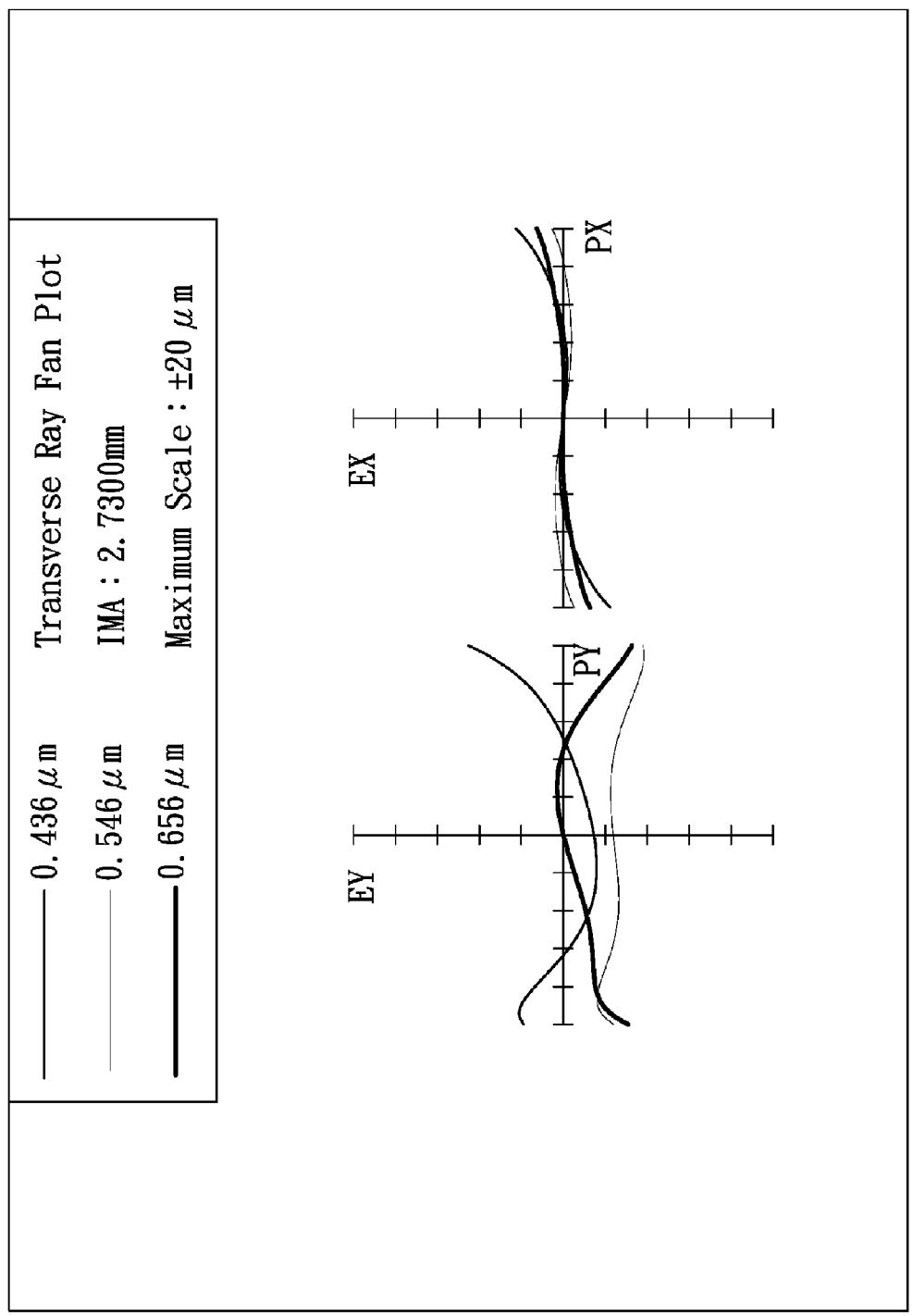
Figure 6E:
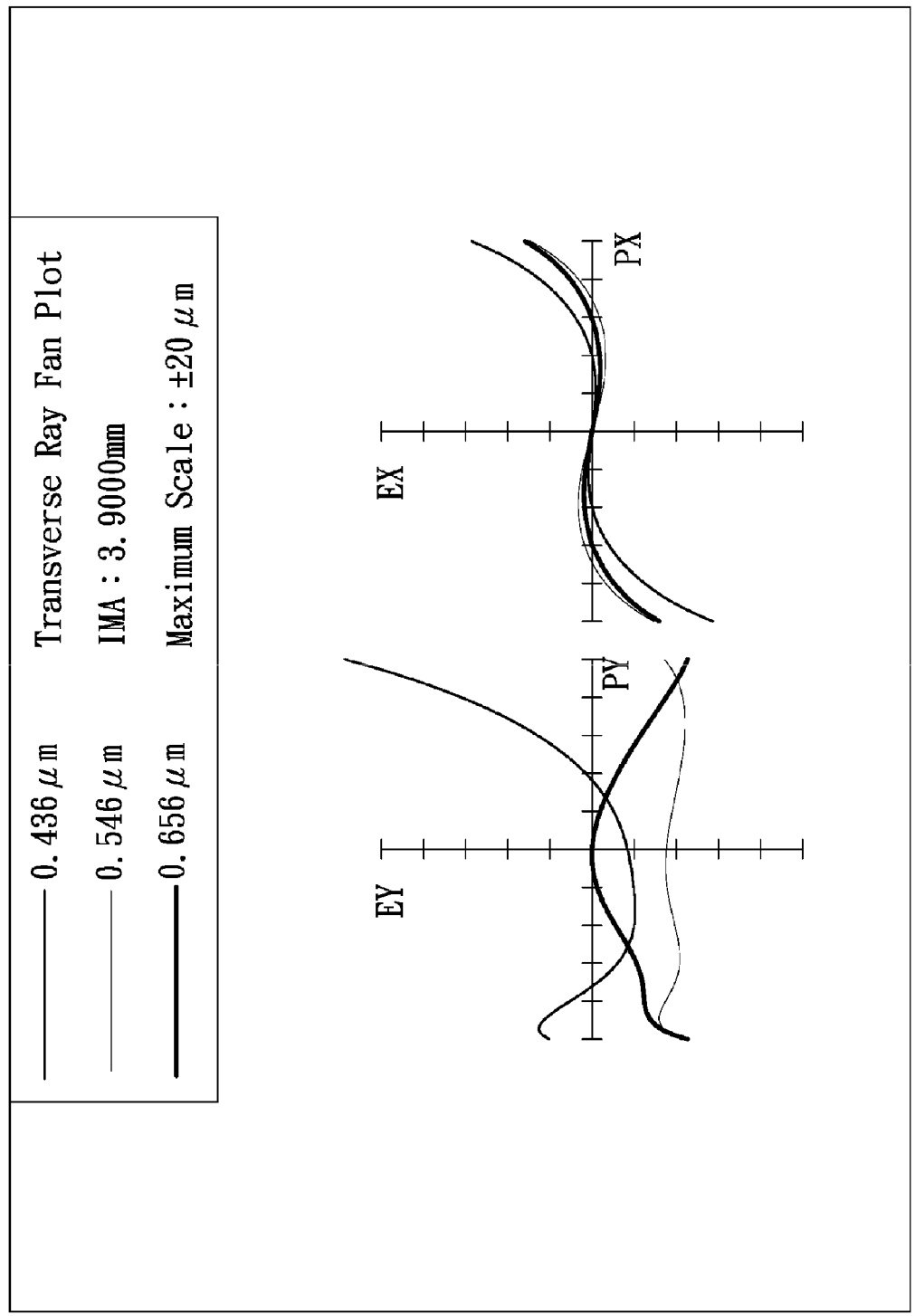
Figure 6G:
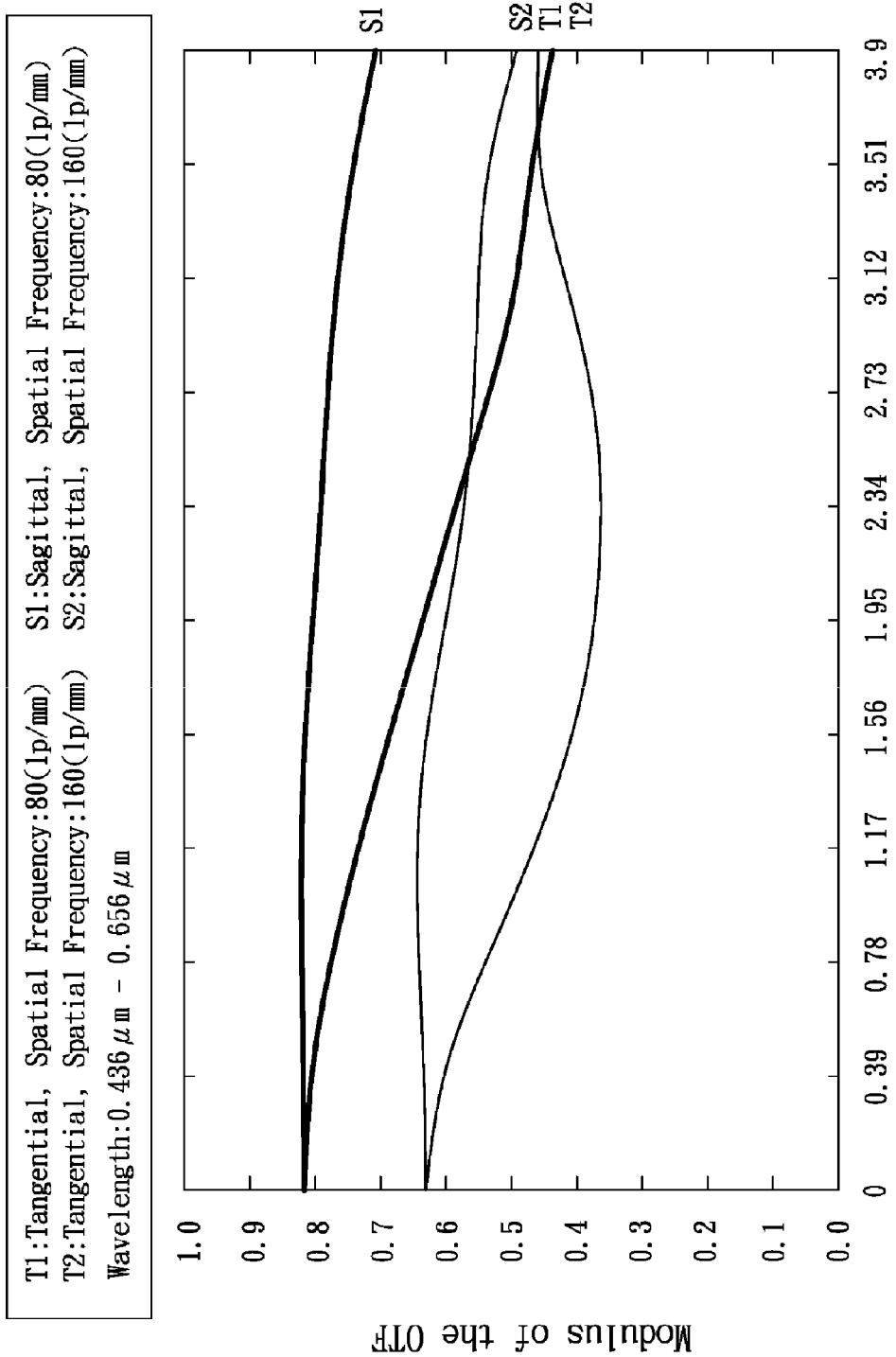
FIG. 6G is a modulation transfer function diagram of the wide-angle lens in accordance with the third embodiment of the invention.

By the above arrangements of the lenses and stop ST3, the wide-angle lens 3 of the third embodiment can meet the requirements of optical performance as seen in FIGS. 6A-6G, wherein FIG. 6A shows the field curvature diagram of the wide-angle lens 3 in accordance with the third embodiment of the invention, FIG. 6B shows the distortion diagram of the wide-angle lens 3 in accordance with the third embodiment of the invention, FIGS. 6C-6E show the transverse ray fan diagrams of the wide-angle lens 3 in accordance with the third embodiment of the invention, FIG. 6F shows the lateral color diagram of the wide-angle lens 3 in accordance with the third embodiment of the invention and FIG. 6G shows the modulation transfer function diagram of the wide-angle lens 3 in accordance with the third embodiment of the invention.

It can be seen from FIG. 6A that the field curvature of tangential direction and sagittal direction in the wide-angle lens 3 of the third embodiment ranges between −0.03 mm and 0.03 mm for the wavelength of 0.436 μm, 0.546 μm and 0.656 μm. It can be seen from FIG. 6B (the three lines in the figure almost coincide to appear as if a signal line) that the distortion in the wide-angle lens 3 of the third embodiment ranges between −63.2% and 0.00% for the wavelength of 0.436 μm, 0.546 μm and 0.656 μm. It can be seen from FIGS. 6C-6E that the transverse ray aberration in the wide-angle lens 3 of the third embodiment ranges between −11.8 μm and 23.5 μm wherein the wavelength is 0.436 μm, 0.546 μm and 0.656 μm, each field is 0.0000 mm, 2.7300 mm and 3.9000 mm. It can be seen from FIG. 6F that the lateral color with reference wavelength is equal to 0.656 μm in the wide-angle lens 3 of the third embodiment ranges between −7.1 μm and 0.2 μm for the wavelength of 0.436 μm, 0.546 μm and 0.656 μm, field ranges between 0 mm and 3.9000 mm. It can be seen from FIG. 6G that the modulation transfer function of tangential direction, sagittal direction and Y field in the wide-angle lens 3 of the third embodiment ranges between 0.44 and 0.82 wherein the wavelength ranges between 0.436 μm and 0.656 μm, Y field ranges between 0 mm and 3.9 mm, spatial frequency is equal to 80 lp/mm. It can be seen from FIG. 6G that the modulation transfer function of tangential direction, sagittal direction and Y field in the wide-angle lens 3 of the third embodiment ranges between 0.36 and 0.63 wherein the wavelength ranges between 0.436 μm and 0.656 μm, Y field ranges between 0 mm and 3.9 mm, spatial frequency is equal to 160 lp/mm. It is obvious that the field curvature, the distortion, the transverse ray aberration and the lateral color of the wide-angle lens 3 of the third embodiment can be corrected effectively, the image resolution can meet the requirement. Therefore, the wide-angle lens 3 of the third embodiment is capable of good optical performance.

In the above embodiments, the fourth lens and the fifth lens are cemented to form the cemented lens. However, it has the same effect and falls into the scope of the invention that there is no air space between the fourth lens and the fifth lens.

What is claimed is:
1. A wide-angle lens consisting of:
a first lens which is with negative refractive power and comprises a convex surface facing the object side;
a second lens which comprises a convex surface facing the object side;
a third lens which is a biconvex lens;
a fourth lens which is a biconvex lens;
a fifth lens which is a biconcave lens; and
a sixth lens which is a biconvex lens;
wherein the first lens, the second lens, the third lens, the fourth lens, the fifth lens and the sixth lens are arranged in sequence from an object side to an image side along an optical axis,
wherein the fourth lens and the fifth lens are cemented together to form a cemented lens;
wherein the sixth lens satisfies:

$$2.2377 \leq f_6/f \leq 2.402$$

wherein $f_6$ is an effective focal length of the sixth lens and f is an effective focal length of the wide-angle lens.
2. The wide-angle lens as claimed in claim 1, wherein the first lens satisfies:

$$f_1/f<0$$

wherein $f_1$ is an effective focal length of the first lens and f is an effective focal length of the wide-angle lens.
3. The wide-angle lens as claimed in claim 1, wherein the first lens and the sixth lens satisfy:

$$0.5<|f_1/f_6|<5$$

wherein $f_1$ is an effective focal length of the first lens and $f_6$ is an effective focal length of the sixth lens.

4. The wide-angle lens as claimed in claim 1, wherein the second lens further comprises a surface, wherein the surface is an aspheric surface, or the convex surface of the second lens is an aspheric surface, or both of the surface and the convex surface of the second lens are aspheric surfaces.

5. The wide-angle lens as claimed in claim 1, wherein the third lens comprises two convex surfaces, at least one of which is an aspheric surface or both of which are aspheric surfaces.

6. The wide-angle lens as claimed in claim 1, wherein the sixth lens comprises two convex surfaces, at least one of which is an aspheric surface or both of which are aspheric surfaces.

7. The wide-angle lens as claimed in claim 1, wherein no air space exists between the fourth lens and the fifth lens.

8. The wide-angle lens as claimed in claim 1, wherein the first lens, the second lens, the third lens, the fourth lens, the fifth lens and the sixth lens are made of glass material.

9. The wide-angle lens as claimed in claim 1, wherein the first lens and the sixth lens satisfy:

$$f_1/f<0,$$

$$0.5<|f_1/f_6|<5$$

wherein $f_1$ is an effective focal length of the first lens, f is an effective focal length of the wide-angle lens and $f_6$ is an effective focal length of the sixth lens.

10. The wide-angle lens as claimed in claim 1, wherein the first lens and the sixth lens satisfy:

$$1.4913 \leq |f_1/f_6| < 5$$

wherein $f_1$ is an effective focal length of the first lens and $f_6$ is an effective focal length of the sixth lens.

11. A wide-angle lens consisting of:
a first lens which is with negative refractive power and comprises a convex surface facing the object side;
a second lens which comprises a convex surface facing the object side;
a third lens which is a biconvex lens;
a stop;
a fourth lens which is a biconvex lens;
a fifth lens which is a biconcave lens; and
a sixth lens which is a biconvex lens;
wherein the first lens, the second lens, the third lens, the stop, the fourth lens, the fifth lens and the sixth lens are arranged in sequence from an object side to an image side along an optical axis;
wherein the fourth lens and the fifth lens are cemented together to form a cemented lens;
wherein the first lens and the sixth lens satisfies:

$$1.4913 \leq |f_1/f_6| \leq 1.785$$

wherein $f_6$ is an effective focal length of the sixth lens and $f_1$ is an effective focal length of the first lens.

12. The wide-angle lens as claimed in claim 11, wherein the sixth lens satisfies:

$$0<f_6/f<10$$

wherein $f_6$ is an effective focal length of the sixth lens and f is an effective focal length of the wide-angle lens.

13. A wide-angle lens consisting of:
a first lens which is with negative refractive power and comprises a convex surface facing the object side;
a second lens which comprises a convex surface facing the object side;
a third lens which is a biconvex lens;
a stop;
a fourth lens which is a biconvex lens;
a fifth lens which is a biconcave lens; and
a sixth lens which is a biconvex lens;
wherein the first lens, the second lens, the third lens, the stop, the fourth lens, the fifth lens and the sixth lens are arranged in sequence from an object side to an image side along an optical axis;
wherein the fourth lens and the fifth lens are cemented together to form a cemented lens
wherein the sixth lens satisfies:

$$2.2377 \leq f_6/f \leq 2.402$$

wherein $f_6$ is an effective focal length of the sixth lens and f is an effective focal length of the wide-angle lens.

14. The wide-angle lens as claimed in claim 13, wherein the first lens and the sixth lens satisfy:

$$f_1/f<0,$$

$$0.5<|f_1/f_6|<5$$

wherein $f_1$ is an effective focal length of the first lens, f is an effective focal length of the wide-angle lens and $f_6$ is an effective focal length of the sixth lens.

15. The wide-angle lens as claimed in claim 13, wherein the first lens satisfies:

$$f_1/f<0,$$

wherein $f_1$ is an effective focal length of the first lens; and f is an effective focal length of the wide-angle lens.

16. The wide-angle lens as claimed in claim 13, wherein the first lens and the sixth lens satisfy:

$$0.5<|f_1/f_6|<5,$$

wherein $f_1$ is an effective focal length of the first lens and $f_6$ is an effective focal length of the sixth lens.

17. The wide-angle lens as claimed in claim 13, wherein the first lens and the sixth lens satisfy:

$$1.4913 \leq |f_1/f_6| < 5$$

wherein $f_1$ is an effective focal length of the first lens and $f_6$ is an effective focal length of the sixth lens.

* * * * *